(12) United States Patent
Jackson et al.

(10) Patent No.: US 12,075,776 B2
(45) Date of Patent: Sep. 3, 2024

(54) SYNTHETIC LURES

(71) Applicant: VICTORIA LINK LIMITED, Wellington (NZ)

(72) Inventors: Michael David Jackson, Wellington (NZ); Wayne Leslie Linklater, Wellington (NZ); Robert Alexander Keyzers, Wellington (NZ)

(73) Assignee: VICTORIA LINK LIMITED, Wellington (NZ)

( * ) Notice: Subject to any disclaimer, the term of this patent is extended or adjusted under 35 U.S.C. 154(b) by 879 days.

(21) Appl. No.: 16/468,340

(22) PCT Filed: Dec. 19, 2017

(86) PCT No.: PCT/IB2017/058092
§ 371 (c)(1),
(2) Date: Jun. 11, 2019

(87) PCT Pub. No.: WO2018/116142
PCT Pub. Date: Jun. 28, 2018

(65) Prior Publication Data
US 2021/0127670 A1    May 6, 2021

(30) Foreign Application Priority Data

Dec. 20, 2016 (AU) ............................... 2016905268
Feb. 23, 2017 (AU) ............................... 2017900596

(51) Int. Cl.
| | | |
|---|---|---|
| A01N 31/02 | (2006.01) | |
| A01N 25/00 | (2006.01) | |
| A01N 27/00 | (2006.01) | |
| A01N 35/02 | (2006.01) | |
| A01N 37/02 | (2006.01) | |

(52) U.S. Cl.
CPC ............ *A01N 31/02* (2013.01); *A01N 25/004* (2013.01); *A01N 27/00* (2013.01); *A01N 35/02* (2013.01); *A01N 37/02* (2013.01)

(58) Field of Classification Search
CPC ............................. A01N 27/00; A01N 25/004
See application file for complete search history.

(56) References Cited

U.S. PATENT DOCUMENTS

| | | | |
|---|---|---|---|
| 4,144,199 A | 3/1979 | Wille et al. | |
| 6,264,939 B1* | 7/2001 | Light | A01M 1/02 424/84 |
| 6,528,049 B2 | 3/2003 | Light et al. | |
| 2002/0155142 A1* | 10/2002 | Barcay | A01N 25/006 424/408 |
| 2006/0233913 A1 | 10/2006 | Hansen | |
| 2009/0281190 A1 | 11/2009 | Khaskin et al. | |
| 2010/0227010 A1* | 9/2010 | Jones | A01N 37/02 424/747 |
| 2016/0330957 A1 | 11/2016 | Quiroz et al. | |
| 2016/0360740 A1 | 12/2016 | Bassan, Jr. | |
| 2017/0332629 A1* | 11/2017 | Rametsteiner | B32B 9/045 |
| 2018/0014524 A1* | 1/2018 | Peterson | A01M 1/106 |

FOREIGN PATENT DOCUMENTS

| | | | |
|---|---|---|---|
| CN | 100370899 C | * 2/2008 | ........... A01N 25/006 |
| CN | 102845474 A | 1/2013 | |
| CN | 102850966 A | 1/2013 | |
| CN | 104774688 A | 7/2015 | |
| CN | 105011091 A | 11/2015 | |
| CN | 105132173 A | 12/2015 | |
| JP | S4826222 B1 | 8/1973 | |
| WO | 2013064678 A1 | 5/2013 | |

OTHER PUBLICATIONS

Gawienowski et al. J Chem Ecol, 5/4, 1979, 595-601.*
Chen, W. et al., "Preparation of thermal-reactive peanut essence in nonaqueous system," China Oil, vol. 38, No. 12, 2013, pp. 67-71.
Supplementary European Search Report issued on Jun. 25, 2020 for corresponding European Application No. 17883885.
Yuri Ishii et al., "Effective Trapping of Fruit Flies with Cultures of Metabolically Modified Acetic Acid Bacteria," Applied and Environmental Microbiology, vol. 81, No. 7, 2015, pp. 2265-2273 XP055704566.
Frederic Y. Oppliger et al., "Neurophysiological and behavioral evidence for an olfactory function for the dorsal organ and and a gustatory one for the terminal organ in *Drosophila melanogaster* larvae," Journal of Insect Physiology, vol. 46, No. 2, 2000, pp. 135-144 XP055703833.
M. Winter et al., "Volatile Carbonyl Constituents of Dairy Butter," Journal of Food Science, vol. 28, No. 5, 1963, pp. 554-561 XP055704650.
Nooshin Karimifar et al., "General Food Semiochemicals Attarct Omnivorous German Cockroaches, *Blattella germanica*," Journal of Agricultural and Food Chemistry, vol. 59, No. 4, 2011, pp. 1330-1337 XP055380976.
International Search Report and Written Opinion issued on Feb. 14, 2018 for corresponding PCT Application No. PCT/IB2017/058092.
Hern, Alan et al., "Induced emissions of apple fruit volatiles by the codling moth: changing patterns with different time periods after infestation and different larval instars," Phytochemistry, vol. 57, 2001, pp. 409-416.
Kemp, Thomas et al., "Volatile cucumis melo components: identification of additional compounds and effects of storage conditions," Phytochemistry, vol. 12, 1973, pp. 2921-2924.
Young, Harry et al., "Casual effects of aroma compounds on royal gala apple flavours," J Sci Food Agric, vol. 71, 1996, pp. 329-336.

(Continued)

*Primary Examiner* — Kyle A Purdy
(74) *Attorney, Agent, or Firm* — POLSINELLI PC

(57) ABSTRACT

The present application relates to semiochemical-based lures for mammals, particularly mammalian pest species that are useful for monitoring, capturing and/or controlling mammals and to methods of using semiochemical-based lures for monitoring, capturing and/or controlling mammals, particularly mammalian pest species. The present application also relates to the use of semiochemical-based lures for monitoring, capturing and/or controlling mammals, particularly mammalian pest species. In some embodiments, semiochemical-based lures are useful for reducing the number of mammalian pest species in one or more designated target environments.

9 Claims, 5 Drawing Sheets

(56) References Cited

OTHER PUBLICATIONS

Cacho, Juan et al., "Characterization of the aromatic profile of the quebranta variety of Peruvian pisco by gas chromatography-olfactometry and chemical analysis," Flavour and Fragrance Journal, vol. 27, 2012, pp. 322-333.
Jackson, Michael D. et al., "The Development of Semiochemical Lures fir Invasive Rats: An Integrated Chemical Image and Response-Guided Approach," Proc. 27th Vertebra. Pest Conf. (R.M. Timms and R.A. Baldwin, Eds.) Published at Univ. of Calif., Davis, 2016, whole document.
Jackson, Michael et al., "Better food-based baits and lures for invasive rats *Rattus* spp. and the brushtail possum *Trichosurus vulpecula*: a bioassay on wild, free-ranging animals," Journal of Pest Science, vol. 89, Iss. 2, 2016, pp. 479-488 (whole document).
European Exam Report issued on Mar. 16, 2022 for corresponding European Application No. 17883885.0.
Michael Jackson et al., "Supplementary Material 1: Rat multi-model hypotheses and references from which model concepts were derived Model Source," Journal of Pest Science, 2015 XP055899584.

\* cited by examiner

SYNTHETIC LURES

CROSS-REFERENCE TO RELATED APPLICATIONS

This application is a national stage application (under 35 U.S.C. § 371) of PCT/IB2017/058092, filed Dec. 19, 2017, which claims benefit of Australian Applications Nos. 2016905268, filed Dec. 20, 2016, and 2017900596, filed Feb. 23, 2017, which are incorporated herein by reference in their entireties.

TECHNICAL FIELD

The invention relates generally to semiochemical-based lures for mammals, particularly mammalian pest species that are useful for monitoring, capturing and/or controlling mammals, to methods of using such lures, and to the use of such lures for monitoring, capturing and/or controlling mammals, particularly mammalian pest species. In some embodiments, semiochemical-based lures are useful for reducing the number of mammalian pest species in one or more designated target environments.

BACKGROUND OF THE INVENTION

Olfactory lures are important tools in wildlife management and conservation ecology, being widely used in monitoring and capture, reducing human-wildlife conflicts, influencing habitat movement and eradicating pest species (Rosell and Kvinlaug 1998; Apfelbach et al. 2005; Kok et al. 2013). For invertebrates, the use of volatile semiochemicals as synthetic lures predominates and has been well exploited for decades (Witzgall et al. 2010). For example, methyl eugenol (a plant kairomone) has been used as an attractant to fruit flies (Dacus spp.) for nearly 100 years (Metcalf and Metcalf 1992). For vertebrates, however, olfactory lures are commonly foods such as peanut butter or animal products such as fresh or dried meat. However, food-based lures have distinct disadvantages in use being perishable and requiring frequent replenishment. For example, meat-based lures will quickly go rancid while foods such as peanut butter will dry out and/or mould, factors that quickly impact their aroma profile and therefore the attractiveness of the lure. These issues decrease control operation efficacy and increase labour costs (Parshad 2002; Linklater et al. 2013; Murphy et al. 2014).

Accordingly there is a need in the art for new types of lures that can overcome some of the known disadvantages of food-based lures.

It is an object of the invention to go at least some way towards avoiding the disadvantages associated with food-based lures by providing new lures for mammals, particularly mammalian pest species, that are not perishable and that do not require frequent replenishing, and/or that at least provide the public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

In one aspect, the present invention relates to a combination comprising at least one of isoamyl alcohol, 1-hexanol, acetoin, isobutyl acetate and 2-methylbutyl acetate or any combination thereof.

In another aspect the invention relates to a combination consisting essentially of at least one of isoamyl alcohol, 1-hexanol, acetoin, isobutyl acetate and 2-methylbutyl acetate or any combination thereof.

In another aspect the invention relates to a combination consisting of at least one of isoamyl alcohol, 1-hexanol, acetoin, isobutyl acetate and 2-methylbutyl acetate or any combination thereof, and a carrier, excipient or diluent.

In another aspect the invention relates to a composition comprising a combination of the invention.

In another aspect the invention relates to a combination or composition of the invention for use in attracting at least one mammalian pest species to a treatment locus.

In another aspect the invention relates to a method of attracting at least one mammalian pest species to a treatment locus comprising placing a combination or composition of the invention at the treatment locus.

In another aspect the invention relates to a method of controlling at least one mammalian pest species in a treatment environment comprising placing a combination or composition of the invention in the treatment environment.

In another aspect the invention relates to the use of a combination or composition of the invention to attract at least one mammalian pest species to a treatment locus.

In another aspect the invention relates to a method of making a combination or composition that attracts at least one mammalian pest species comprising formulating at least one of isoamyl alcohol, 1-hexanol, acetoin, isobutyl acetate and 2-methylbutyl acetate or any combination thereof to attract the least one mammalian pest species.

In another aspect the invention relates to a method of making a combination or composition that attracts at least one mammalian pest species comprising formulating at least two, or at least three, or at least four, or all five of isoamyl alcohol, 1-hexanol, acetoin, isobutyl acetate and 2-methylbutyl acetate or any combination thereof to attract at least one mammalian pest species.

Various embodiments of the different aspects of the invention as discussed above are also set out below in the detailed description of the invention, but the invention is not limited thereto.

Other aspects of the invention may become apparent from the following description which is given by way of example only and with reference to the accompanying drawings.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION OF THE INVENTION

Definitions

Figure 1:
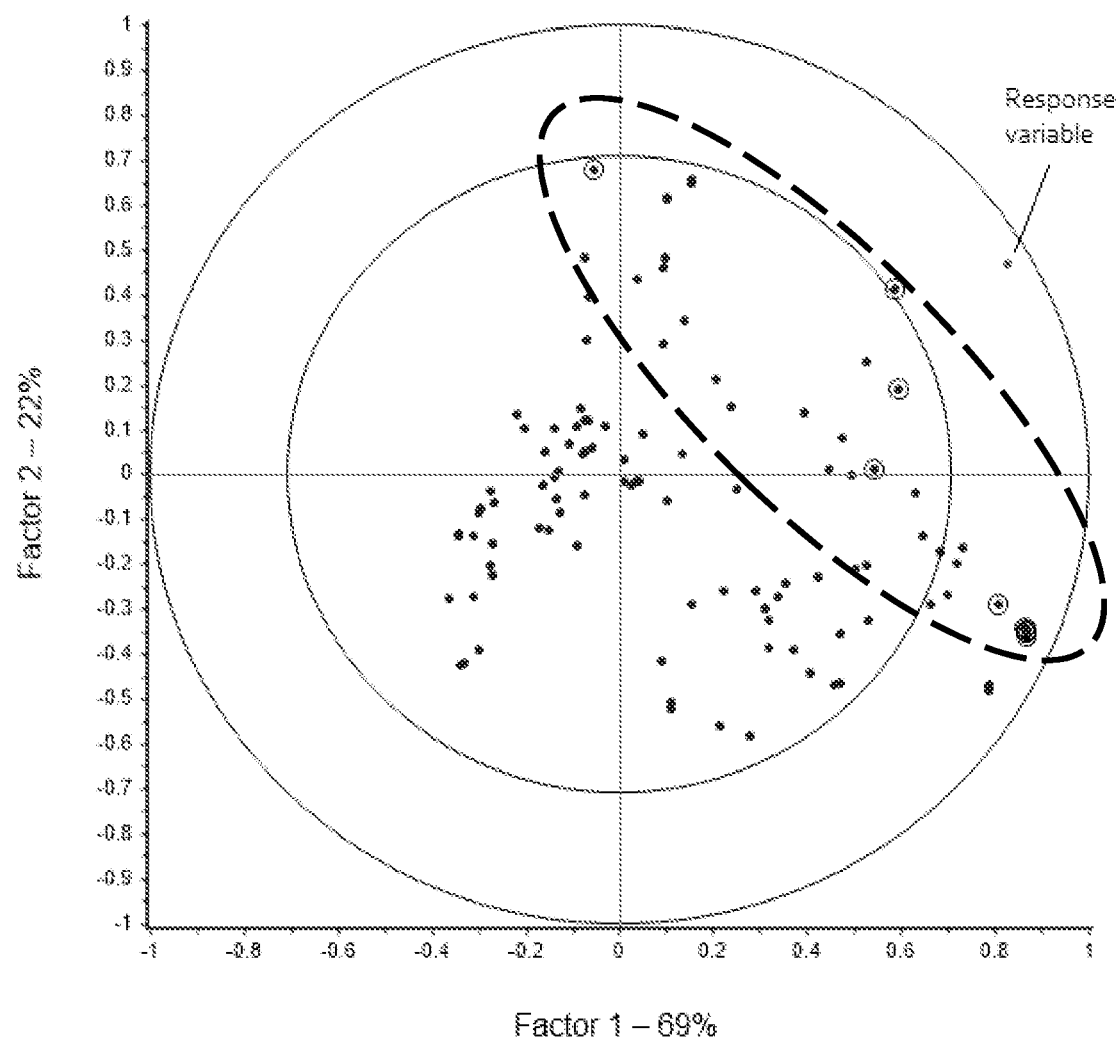
FIG. 1. Partial least squares regression plot of the models first two factors and associated explained variance. Points are compounds while circled points are compounds statistically significant to the model. The response variable is indicated. Negative markers on the x and y axis indicate negative correlations to that factor while positive markers indicate positive correlations to factors. Statistically significant positively correlated compounds are shown within the dotted ellipse.

Unless otherwise specified, all technical and scientific terms used herein are to be understood as having the same meanings as is understood by one of ordinary skill in the relevant art to which this disclosure pertains. Examples of definitions of common terms in biochemistry can be found in Cammack et al. (2006).

It is also believed that practice of the present invention can be performed using standard chemical and biochemical protocols and procedures as known in the art, and as described, for example in (Pawliszyn 1997; Pawliszyn 1999; Hubschmann 2015) and other commonly available reference materials relevant in the art to which this disclosure pertains, and which are all incorporated by reference herein in their entireties.

The following definitions are presented to better define the present invention and as a guide for those of ordinary skill in the art in the practice of the present invention.

The term "attractant" is used herein refers to a compound or combination of compounds identified by the inventors and described herein as acting to attract at least one mammalian pest species. The term "attractant compound" is used herein to refer to the individual compounds as described herein that are identified as attractants. In some embodiments of the invention an "attractant" is at least one of isoamyl alcohol, 1-hexanol, acetoin, isobutyl acetate and 2-methylbutyl acetate or a combination thereof.

In some embodiments of the invention, an "attractant" is a combination or composition of the invention.

The term "a functional analogue, variant or derivative of isoamyl alcohol, 1-hexanol, acetoin, isobutyl acetate and 2-methylbutyl acetate" refers to a chemical variant, analogue or derivative of isoamyl alcohol, 1-hexanol, acetoin, isobutyl acetate or 2-methylbutyl acetate that functions as an attractant by acting to attract at least one mammalian pest species.

The term "controlling" as used herein with regard to mammalian pest species means that the composition or combination of the invention is effective in reducing the population of the mammalian pest species in a treatment environment.

The term "treatment environment" as used herein refers to an environment that has been, is being, or is to be treated with a combination or composition according to the invention as compared to a control environment that is un-treated.

A "treatment locus" as used herein is a locus that has been, is being or is to be treated, with a combination or composition of the invention. For example, a "treatment locus" may be a place within a treatment environment to which a combination or composition according to the invention is applied to attract at least one mammalian pest species. In some embodiments a treatment locus is a substrate that provides for maintenance and controlled release of a combination or composition according to the invention. In some embodiments a treatment locus is comprised within (fully or partially) or disposed on a trapping device. In some embodiments a treatment locus is a substrate that is then positioned in a treatment environment. In one embodiment a treatment locus is a trapping device. In one embodiment a treatment locus is a housing contained in and/or disposed on a trapping device.

The term "synthetic combination" according to the invention means a combination that is not found in nature. In one embodiment a "synthetic combination of the invention" is not a processed food, preferably not chocolate milk, dark chocolate, Nutella®, pasta, peanut butter or dried pet food. In one embodiment the synthetic combination according the invention is not a processed food containing at least one of the following foods: almonds, bacon, barley, black pepper, coconut, coffee, egg, ginger, millet, rice, sardines, soybean, sweetcorn, walnut or yeast. In one embodiment the synthetic combination of the invention is not soap.

The term "synthetic composition" according to the invention means a composition that is not found in nature. In one embodiment a "synthetic composition of the invention" is not a processed food, preferably not chocolate milk, dark chocolate, Nutella®, pasta, peanut butter or dried pet food. In one embodiment the synthetic composition according the invention is not a processed food containing at least one of the following foods: almonds, bacon, barley, black pepper, coconut, coffee, egg, ginger, millet, rice, sardines, soybean, sweetcorn, walnut or yeast. In one embodiment the synthetic composition of the invention is not soap.

The term "synthetic lure" refers to a lure as described herein, that attracts mammalian pest species and that comprises a synthetic combination or synthetic composition as described herein. In one embodiment a "synthetic lure of the invention" is not a processed food, preferably not chocolate milk, dark chocolate, Nutella®, pasta, peanut butter or dried pet food. In one embodiment the synthetic lure according the invention is not a processed food containing at least one of the following foods: almonds, bacon, barley, black pepper, coconut, coffee, egg, ginger, millet, rice, sardines, soybean, sweetcorn, walnut or yeast. In one embodiment the synthetic lure of the invention is not soap.

The terms "mammalian pest species" and "mammalian pests" (and similar grammatical constructions) refer to mammals that are considered detrimental to humans or human concerns. For example, mammals that are detrimental to agricultural or livestock production, that are destructive of property, or that are otherwise considered a nuisance.

The terms "rodent" and "rodents" as used herein mean members of the Rodentia.

The terms "control environment", "control locus" and a "control treatment" take their ordinary meaning in the art and are used herein to indicate environments, loci and/or treatments from which baseline data is gathered for comparison to data obtained from a corresponding treatment environment or locus. Comparison of data taken from the treatment environment/locus and from a control environment/locus, allows identification of any variation seen between the baseline and the treatment environment and/or locus.

As used herein, PPM equates to the concentration of compounds in a solution i.e., the carrier media the compounds are mixed with. For example, to obtain the desired release rate from an emulsion-type lure, the concentration may be 1 ppm. So, in 1 g you would have 0.999999 grams of emulsion and 0.00001 grams of compound. By way of non-limiting example, a reservoir lure with a release membrane this concentration may be 1000 ppm in MCT oil (So, 0.999 grams of MCT oil and 0.001 grams of compound).

A level "higher" or "lower" than a control, or a change or deviation from a control in one embodiment is statistically significant. A higher level, lower level, deviation from, or change from a control level or mean control level can be considered to exist if the level differs from the control level by 5% or more, by 10% or more, by 20% or more, or by 50% or more compared to the control level. Statistically significant may alternatively be calculated as $P \leq 0.10$, 0.05. In a further alternative, higher levels, lower levels, deviation, and changes can be determined by recourse to assay reference limits or reference intervals. These can be calculated from intuitive assessment or non-parametric methods. Overall, these methods calculate the 0.025, and 0.975 fractiles as 0.025*(n+1) and 0.975 (n+1). Such methods are well known in the art (Hunt et al. 1997; Wild 2013). The terms "reduces", "reduced" and "reducing" and other grammatical variations as used herein mean the same thing as "lower".

A "statistically significant amount" as used herein describes a mathematical measure of difference between groups. The difference is said to be statistically significant if it is greater than what might be expected to happen by chance alone.

The term "comprising" as used in this specification means "consisting at least in part of". When interpreting statements in this specification that include that term, the features, prefaced by that term in each statement, all need to be present but other features can also be present. Related terms such as "comprise" and "comprised" are to be interpreted in the same manner.

The term "consisting essentially of" as used herein means the specified materials or steps and those that do not materially affect the basic and novel characteristic(s) of the claimed invention.

The term "consisting of" as used herein means the specified materials or steps of the claimed invention, excluding any element, step, or ingredient not specified in the claim.

Description

The inventors believe that they are the first to provide synthetic semiochemical based lures for mammalian pest species that overcome the limitations of currently employed food-based lures while offering additional benefits such as having temporally consistent odour properties, long life, ease of handling and storage, sex and/or behaviour-specific responses, and species specificity.

In particular, the inventors have unexpectedly identified that isoamyl alcohol, 1-hexanol, acetoin, isobutyl acetate and 2-methylbutyl acetate are effective attractants of mammalian pest species, particularly rodents. Each of these compounds is also referred to herein as an "attractant compound" of the invention. The inventors have also identified that a synthetic combination comprising or consisting essentially of at least one of isoamyl alcohol, 1-hexanol, acetoin, isobutyl acetate and 2-methylbutyl acetate, or a combination thereof is an effective attractant of mammalian pest species, particularly rodents.

To the best of the inventors' knowledge, they are the first to use any one or a combination of, isoamyl alcohol, 1-hexanol, acetoin, isobutyl acetate and 2-methylbutyl acetate as attractant compounds for mammalian species, particularly mammalian pest species, particularly rodents. The inventors further believe that they are the first to provide synthetic combinations and compositions comprising or consisting of at least one of isoamyl alcohol, 1-hexanol, acetoin, isobutyl acetate and 2-methylbutyl acetate that are effective attractants for at least one mammalian species, particularly mammalian pest species, particularly rodents. The attractant compounds, combinations and compositions of the invention may be formulated as lures for attracting mammalian pest species to predetermined locations where they may be captured and/or killed.

It will be appreciated that although some of the attractant compounds that may be used in the combinations and compositions of the invention may be known per se in the context of edible foods, none of the particular attractant compounds (or combinations of compounds) as identified and disclosed herein could have been predicted by a skilled worker to be a compound that would act to attract at least one mammalian species, particularly a mammalian pest species, particularly rats.

In the present disclosure, the inventors identified 375 compounds from 19 different edible food sources as described herein. Each compound was required to be tested empirically to determine if it was an attractant because it is not possible to predict from the identity or abundance of the compounds alone, which of the identified compounds would act as an attractant.

Combinations and Compositions for Controlling Mammalian Pest Species

Accordingly, in one aspect the present invention relates to a combination comprising at least one of isoamyl alcohol, 1-hexanol, acetoin, isobutyl acetate and 2-methylbutyl acetate or any combination thereof.

In another aspect the invention relates to a combination consisting essentially at least one of isoamyl alcohol, 1-hexanol, acetoin, isobutyl acetate and 2-methylbutyl acetate or any combination thereof.

In another aspect the invention relates to a combination consisting of at least one of isoamyl alcohol, 1-hexanol, acetoin, isobutyl acetate and 2-methylbutyl acetate or any combination thereof, and a carrier, excipient or diluent.

In one embodiment the at least one of isoamyl alcohol, 1-hexanol, acetoin, isobutyl acetate and 2-methylbutyl acetate in the combination is a functional analogue, variant or derivative of isoamyl alcohol, 1-hexanol, acetoin, isobutyl acetate or 2-methylbutyl acetate.

In one embodiment the combination is a synthetic combination.

In one embodiment the combination or synthetic combination comprises a concentration of at least one of isoamyl alcohol, 1-hexanol, acetoin, isobutyl acetate and 2-methylbutyl acetate that is not found in an edible food. In one embodiment the edible food is a processed food, preferably a processed food selected from the group consisting of cheese, chocolate milk, dark chocolate, Nutella®, pasta, peanut butter and dried pet food. In one embodiment the edible food is a processed food containing at least one of almonds, bacon, barley, black pepper, coconut, coffee, egg, ginger, millet, rice, sardines, soybean, sweetcorn, walnut or yeast.

In one embodiment the combination or synthetic combination comprises a concentration of at least one of isoamyl alcohol, 1-hexanol, acetoin, isobutyl acetate and 2-methylbutyl acetate that is not found in soap.

In one embodiment the combination or synthetic combination comprising or consisting essentially of at least one of isoamyl alcohol, 1-hexanol, acetoin, isobutyl acetate and 2-methylbutyl acetate or any combination thereof further comprises a carrier, excipient or diluent.

In one embodiment the carrier, excipient or diluent is an aqueous carrier or an oil. In one embodiment the carrier, excipient or diluent is formulated as an emulsion, preferably a controlled release emulsion. In one embodiment the oil is a fractionated oil. In one embodiment the oil is a plant oil. In one embodiment the plant oil is coconut oil, preferably fractionated coconut oil.

In one embodiment the carrier is a nano-porous aromatized material. In one embodiment the material is in the form of a stick, block, pad, sheet, tablet, pellet, ball, rod, granule, capsule, filament, rope, line, twine, or string. A person of skill in the art is able to formulate an attractant compound, combination or composition as described herein into many different shapes and sizes as appropriate for the intended application of the material.

A skilled worker appreciates that the purpose of the carrier, diluent and/or excipient is to provide an attractant compound or combination of the invention in a form that attracts at least one mammalian pest species under the conditions found within a particular treatment environment, or that attracts at least one mammalian pest species under the conditions found within a set of environmental parameters that define the habitat in which the mammalian pest species is found. Accordingly, a skilled worker is able to choose an appropriate carrier, diluent or excipient to allow an attractant compound or combination of the invention to be formulated for attracting a given mammalian pest species, preferably a rodent, preferably a rat or mouse, based on their understanding of the environmental conditions anticipated to be found within a particular treatment environment.

In one embodiment the combination comprises or consists essentially of at least two of isoamyl alcohol, 1-hexanol, acetoin, isobutyl acetate and 2-methylbutyl acetate. In one embodiment the combination comprises or consists essentially of at least three of isoamyl alcohol, 1-hexanol, acetoin, isobutyl acetate and 2-methylbutyl acetate. In one embodiment the combination comprises or consists essentially of at least four of isoamyl alcohol, 1-hexanol, acetoin, isobutyl acetate and 2-methylbutyl acetate. In one embodiment the combination comprises or consists essentially of isoamyl alcohol, 1-hexanol, acetoin, isobutyl acetate and 2-methylbutyl acetate. In one embodiment the combination further comprises a carrier, excipient or diluent.

In one embodiment the combination consists of at least one of isoamyl alcohol, 1-hexanol, acetoin, isobutyl acetate and 2-methylbutyl acetate and a carrier, diluent or excipient. In one embodiment the combination consists of at least two of isoamyl alcohol, 1-hexanol, acetoin, isobutyl acetate and 2-methylbutyl acetate and a carrier, diluent or excipient. In one embodiment the combination consists of at least three of isoamyl alcohol, 1-hexanol, acetoin, isobutyl acetate and 2-methylbutyl acetate and a carrier, diluent or excipient. In one embodiment the combination consists of at least four of isoamyl alcohol, 1-hexanol, acetoin, isobutyl acetate and 2-methylbutyl acetate and a carrier, diluent or excipient. In one embodiment the combination consists of isoamyl alcohol, 1-hexanol, acetoin, isobutyl acetate and 2-methylbutyl acetate and a carrier, diluent or excipient.

In some embodiments each of the isoamyl alcohol, 1-hexanol, acetoin, isobutyl acetate and 2-methylbutyl acetate, when present in the combination, is provided separately in the combination. In some embodiments the isoamyl alcohol, 1-hexanol, acetoin, isobutyl acetate and 2-methylbutyl acetate, when present in the combination, are provided in a single mixture in the combination.

By way of non-limiting example, a device useful for attracting a mammalian pest species as described herein may comprise a combination of the invention comprising 1-hexanol and 2-methylbutyl acetate. In the device, the 1-hexanol and 2-methylbutyl acetate may be stored separately to be combined when released from the device as an aerosol, or may be stored separately and then released separately as aerosols from the device to combine in the atmosphere. Alternatively the 1-hexanol and 2-methylbutyl acetate may be combined in a single mixture or preparation for storage in, and release as an aerosol from the device.

A skilled worker will appreciate that in view of the disclosure of the present invention there are many different types of devices that may be used, adapted for use or designed to effectively employ the general inventive concept of the invention related to the identification of an unexpected set of attractant compounds of mammalian pest species and the use of such compounds to aid in the trapping and eradication of these species from vulnerable environments. For example, in one embodiment the device is a sealed container comprising an opening covered by a semi-permeable membrane that mediates the release of attractant compounds as described herein from within the container. In one embodiment the container is a vial, preferably a plastic, glass, ceramic, or metal vial. In one embodiment the container comprises a lid comprising at least one opening that fits over the container opening and forms an air tight seal with the container opening and the semi-permeable membrane. The attractant compounds within the container are then released from the device by passing from the container through the semi-permeable membrane and the at least one lid opening to the atmosphere.

A skilled person will also appreciate that various combinations of each of isoamyl alcohol, 1-hexanol, acetoin, isobutyl acetate and 2-methylbutyl acetate can be present in a combination of the invention, and that each of the isoamyl alcohol, 1-hexanol, acetoin, isobutyl acetate and 2-methylbutyl acetate can be present at varying concentrations within the combination to provide an attractant for mammalian pest species. Based on the disclosure of the present specification (e.g., the examples and in particular FIG. 4) combined with what is known in the art, it is possible to formulate a combination that has or that provides various combinations of each of isoamyl alcohol, 1-hexanol, acetoin, isobutyl acetate and 2-methylbutyl acetate at various concentrations to provide a combination of compounds that functions as an attractant within the scope of the present invention, that will attract mammalian pest species.

In one embodiment the combination comprises or consists essentially one of the combinations detailed in Table 1. In Table 1, and throughout this specification the following codes are used: A=isoamyl alcohol; B=1-hexanol; C=acetoin; F=isobutyl acetate and I=2-methylbutyl acetate.

TABLE 1

Combinations of the invention

| Single | Dyad | Triad | Tetrad | Pentad |
|---|---|---|---|---|
| A | AB | ABC | ABCF | ABCFI |
| B | AC | ABF | ABCI | |
| C | AF | ABI | ABFI | |
| F | AI | ACF | ACFI | |
| I | BC | ACI | BCFI | |
|   | BF | AFI | | |
|   | BI | BCF | | |
|   | CF | BCI | | |
|   | CI | BFI | | |
|   | FI | CFI | | |

In one embodiment the combinations in Table 1 comprise or consists essentially of less than about 10,000 ppm for each compound, preferably less than about 5,000 ppm, preferably less than about 1000 ppm, preferably less than about 500 ppm, preferably less than about 100 ppm, preferably less than about 10 ppm, preferably less than about 1 ppm, preferably less than about 0.1 ppm, preferably less than about 0.01 ppm, preferably less than about 0.001 ppm, preferably less than about 0.0001 ppm for each compound, preferably the compounds in the combination are selected from A, B, C, F and/or I, or any combination thereof.

In one embodiment the combinations in Table 1 comprise or consist essentially of less than 10,000 ppm for each compound, preferably less than 5,000 ppm, preferably less than 1000 ppm, preferably less than 500 ppm, preferably less than 100 ppm, preferably less than 10 ppm, preferably less than 1 ppm, preferably less than 0.1 ppm, preferably less than 0.01 ppm, preferably less than 0.001 ppm, preferably less than 0.0001 ppm for each compound, preferably less than about 0.0001 ppm for each compound, preferably the compounds in the combination are selected from A, B, C, F and/or I, or any combination thereof.

In one embodiment the combinations in Table 1 comprise or consist essentially of at least about
  0.0001 to no more than 10 ppm Isoamyl alcohol (code A),
  0.0001 to no more than 10 ppm 1-Hexanol (code B),
  0.0001 to no more than 10 ppm Acetoin (code C),
  0.0001 to no more than 10 ppm Isobutyl acetate (code F), or
  0.0001 to no more than 10 ppm 2-methylbutyl acetate (code I),
  in any combination as contemplated herein and/or as set out in Table 1.

In one embodiment the combinations in Table 1 comprise or consist essentially of at least
  0.0001 to no more than about 10 ppm Isoamyl alcohol (code A),
  0.0001 to no more than about 10 ppm 1-Hexanol (code B),
  0.0001 to no more than about 10 ppm Acetoin (code C),
  0.0001 to no more than about 10 ppm Isobutyl acetate (code F), or
  0.0001 to no more than about 10 ppm 2-methylbutyl acetate (code I),
  in any combination as contemplated herein and/or as set out in Table 1.

In one embodiment the combination consists of one of the combinations detailed in Table 1 and a carrier, diluent or excipient. Preferably the combinations in Table 1 consist of less than about 10,000 ppm for each compound, preferably less than about 5,000 ppm, preferably less than about 1000 ppm, preferably less than about 500 ppm, preferably less than about 100 ppm, preferably less than about 10 ppm, preferably less than about 1 ppm, preferably less than about 0.1 ppm, preferably less than about 0.01 ppm, preferably less than about 0.001 ppm, preferably less than 0.0001 ppm for each compound, preferably less than about 0.0001 ppm for each compound, preferably the compounds in the combination are selected from A, B, C, F and/or I, or any combination thereof, and a carrier, diluent or excipient.

In one embodiment the combination consists of one of the combinations detailed in Table 1 and a carrier, diluent or excipient. Preferably the combinations in Table 1 consist of less than 10,000 ppm for each compound, preferably less than 5,000 ppm, preferably less than 1000 ppm, preferably less than 500 ppm, preferably less than 100 ppm, preferably less than 10 ppm, preferably less than 1 ppm, preferably less than 0.1 ppm, preferably less than 0.01 ppm, preferably less than 0.001 ppm, preferably less than 0.0001 ppm for each compound, preferably less than about 0.0001 ppm for each compound, preferably the compounds in the combination are selected from A, B, C, F and/or I, or any combination thereof, and a carrier, diluent or excipient.

In one embodiment the combinations in Table 1 consist of at least
  0.0001 to no more than 10 ppm Isoamyl alcohol (code A),
  0.0001 to no more than 10 ppm 1-Hexanol (code B),
  0.0001 to no more than 10 ppm Acetoin (code C),
  0.0001 to no more than 10 ppm Isobutyl acetate (code F), or
  0.0001 to no more than 10 ppm 2-methylbutyl acetate (code I),
  in any combination as contemplated herein and/or as set out in Table 1, and a carrier, diluent or excipient.

In one embodiment the combination comprises or consists essentially of:
  i. 1-hexanol and 2-methylbutyl acetate,
  ii. 1-hexanol, isobutyl acetate, and 2-methylbutyl acetate,
  iii. 1-hexanol, isobutyl acetate, isoamyl alcohol and acetoin,
  iv. 1-hexanol, isoamyl alcohol, acetoin, and 2-methylbutyl acetate,
  v. 1-hexanol, isoamyl alcohol, isobutyl acetate, and 2-methylbutyl acetate,
  vi. 2-methylbutyl acetate, or
  vii. acetoin.

In one embodiment the combination of i, ii, iii, iv, v, vi or vii further comprises a carrier, diluent or excipient.

In one embodiment the combination consists of:
  i. 1-hexanol and 2-methylbutyl acetate,
  ii. 1-hexanol, isobutyl acetate, and 2-methylbutyl acetate,
  iii. 1-hexanol, isobutyl acetate, isoamyl alcohol and acetoin,
  iv. 1-hexanol, isoamyl alcohol, acetoin, and 2-methylbutyl acetate,
  v. 1-hexanol, isoamyl alcohol, isobutyl acetate, and 2-methylbutyl acetate,
  vi. 2-methylbutyl acetate, or
  vii. acetoin, and
  a carrier, diluent or excipient.

In one embodiment the concentration of 1-hexanol, isoamyl alcohol, acetoin, isobutyl acetate and/or 2-methylbutyl acetate present in the combination is less than about 10,000 ppm, preferably less than about 5000 ppm, preferably less than about 1000 ppm, preferably less than about 500 ppm, preferably less than about 100 ppm, preferably less than about 10 ppm, preferably less than about 5 ppm, preferably less than about 1 ppm, preferably less than about 0.1 ppm, preferably less than about 0.01 ppm, preferably less than about 0.001 ppm, preferably less than about 0.0001 ppm.

In one embodiment the concentration of 1-hexanol, isoamyl alcohol, acetoin, isobutyl acetate and/or 2-methylbutyl acetate present in the combination is less than 10,000 ppm, preferably less than 5000 ppm, preferably less than 1000 ppm, preferably less than 500 ppm, preferably less than 100 ppm, preferably less than 10 ppm, preferably less than 5 ppm, preferably less than 1 ppm, preferably less than 0.1 ppm, preferably less than about 0.01 ppm, preferably less than about 0.001 ppm, preferably less than about 0.0001 ppm.

In one embodiment the combination (i) comprises or consists essentially of at least about 0.001 to no more than about 10 ppm 1-hexanol and at least about 0.0001 to no more than about 10 ppm 2-methylbutyl acetate. In one embodiment the combination (i) comprises or consists essentially of at least 0.001 to no more than 10 ppm 1-hexanol and at least 0.0001 to no more than 10 ppm 2-methylbutyl acetate.

In one embodiment the combination (i) comprises or consists essentially of about 0.001 to about 10 ppm 1-hexanol and about 0.0001 to about 10 ppm 2-methylbutyl acetate. In one embodiment the combination (i) comprises or consists essentially of 0.001 to 10 ppm 1-hexanol and 0.0001 to 10 ppm 2-methylbutyl acetate.

In one embodiment the combination (i) consists of at least about 0.001 to no more than about 10 ppm 1-hexanol, at least about 0.0001 to no more than about 10 ppm 2-methylbutyl acetate, and a carrier, diluent or excipient. In one embodiment, the combination (i) consists of at least 0.001 to no more than 10 ppm 1-hexanol, at least 0.0001 to no more than 10 ppm 2-methylbutyl acetate, and a carrier, diluent or excipient.

In one embodiment the combination (i) consists of about 0.001 to about 10 ppm 1-hexanol, about 0.0001 to about 10 ppm 2-methylbutyl acetate, and a carrier, diluent or excipient. In one embodiment the combination (i) consists of 0.001 to 10 ppm 1-hexanol, 0.0001 to 10 ppm 2-methylbutyl acetate, and a carrier, diluent or excipient.

In one embodiment the combination (ii) comprises or consists essentially of at least about 0.001 to no more than about 10 ppm 1-hexanol, at least about 0.0001 to no more than about 10 ppm isobutyl acetate, and at least about 0.0001 to no more than about 10 ppm 2-methylbutyl acetate. In one embodiment the combination (ii) comprises or consists essentially of at least 0.001 to no more than 10 ppm 1-hexanol, at least 0.0001 to no more than 10 ppm isobutyl acetate, and at least 0.0001 to no more than 10 ppm 2-methylbutyl acetate.

In one embodiment the combination (ii) comprises or consists essentially of about 0.001 to about 10 ppm 1-hexanol, about 0.0001 to about 10 ppm isobutyl acetate and about 0.0001 to about 10 ppm 2-methylbutyl acetate. In one embodiment the combination (ii) comprises or consists essentially of 0.001 to 10 ppm 1-hexanol, 0.0001 to 10 ppm isobutyl acetate and 0.0001 to 10 ppm 2-methylbutyl acetate.

In one embodiment the combination (ii) consists of at least about 0.001 to no more than about 10 ppm 1-hexanol, at least about 0.0001 to no more than about 10 ppm 2-isobutyl acetate, at least about 0.0001 to no more than about 10 ppm 2-methylbutyl acetate, and a carrier, diluent or excipient. In one embodiment, the combination (ii) consists of at least 0.001 to no more than 10 ppm 1-hexanol, at least 0.0001 to no more than 10 ppm isobutyl acetate, at least 0.0001 to no more than 10 ppm 2-methylbutyl acetate, and a carrier, diluent or excipient.

In one embodiment the combination (ii) consists of about 0.001 to about 10 ppm 1-hexanol, about 0.0001 to about 10 ppm isobutyl acetate, about 0.0001 to about 10 ppm 2-methylbutyl acetate, and a carrier, diluent or excipient. In one embodiment the combination (ii) consists of 0.001 to 10 ppm 1-hexanol, 0.0001 to 10 ppm isobutyl acetate, 0.0001 to 10 ppm 2-methylbutyl acetate, and a carrier, diluent or excipient.

In one embodiment the combination (iii) comprises or consists essentially of at least about 0.001 to no more than about 10 ppm 1-hexanol, at least about 0.0001 to no more than about 10 ppm isobutyl acetate, at least about 0.001 to no more than about 10 ppm isoamyl alcohol and at least about 0.001 to no more than about 10 ppm acetoin. In one embodiment the combination (iii) comprises or consists essentially of at least 0.001 to no more than 10 ppm 1-hexanol, at least 0.0001 to no more than 10 ppm isobutyl acetate, at least 0.001 to no more than 10 ppm isoamyl alcohol and at least 0.001 to no more than 10 ppm acetoin.

In one embodiment the combination (iii) comprises or consists essentially of about 0.001 to about 10 ppm 1-hexanol, about 0.0001 to about 10 ppm isobutyl acetate, about 0.001 to about 10 ppm isoamyl alcohol and about 0.001 to about 10 ppm acetoin. In one embodiment the combination (iii) comprises or consists essentially of 0.001 to 10 ppm 1-hexanol, 0.0001 to 10 ppm isobutyl acetate, 0.001 to 10 ppm isoamyl alcohol and 0.001 to 10 ppm acetoin.

In one embodiment the combination (iii) consists of at least about 0.001 to no more than about 10 ppm 1-hexanol, at least about 0.0001 to no more than about 10 ppm isobutyl acetate, at least about 0.001 to no more than about 10 ppm isoamyl alcohol, at least about 0.001 to no more than about 10 ppm acetoin, and a carrier, diluent or excipient. In one embodiment, the combination (iii) consists of at least 0.001 to no more than 10 ppm 1-hexanol, at least 0.0001 to no more than 10 ppm isobutyl acetate, at least 0.001 to no more than 10 ppm isoamyl alcohol, at least 0.001 to no more than 10 ppm acetoin, and a carrier, diluent or excipient.

In one embodiment the combination (iii) consists of about 0.001 to about 10 ppm 1-hexanol, about 0.0001 to about 10 ppm isobutyl acetate, about 0.001 to about 10 ppm isoamyl alcohol, about 0.001 to about 10 ppm acetoin, and a carrier, diluent or excipient. In one embodiment the combination (iii) consists of 0.001 to 10 ppm 1-hexanol, 0.0001 to 10 ppm isobutyl acetate, 0.001 to 10 ppm isoamyl alcohol, 0.001 to 10 ppm acetoin, and a carrier, diluent or excipient.

In one embodiment the combination (iv) comprises or consists essentially of at least about 0.001 to no more than about 10 ppm 1-hexanol, at least about 0.001 to no more than about 10 ppm isoamyl alcohol, at least about 0.001 to no more than about 10 ppm acetoin, and at least about 0.0001 to no more than about 10 ppm 2-methylbutyl acetate. In one embodiment the combination (iv) comprises or consists essentially of at least 0.001 to no more than 10 ppm 1-hexanol, at least 0.001 to no more than 10 ppm isoamyl alcohol, at least 0.001 to no more than 10 ppm acetoin, and at least 0.0001 to no more than 10 ppm 2-methylbutyl acetate.

In one embodiment the combination (iv) comprises or consists essentially of about 0.001 to about 10 ppm 1-hexanol, about 0.001 to about 10 ppm isoamyl alcohol, about 0.001 to about 10 ppm acetoin, and about 0.0001 to about 10 ppm 2-methylbutyl acetate. In one embodiment the combination (iv) comprises or consists essentially of 0.001 to 10 ppm 1-hexanol, 0.001 to 10 ppm isoamyl alcohol, 0.001 to 10 ppm acetoin, and 0.0001 to 10 ppm 2-methylbutyl acetate.

In one embodiment the combination (iv) consists of at least about 0.001 to no more than about 10 ppm 1-hexanol, at least about 0.001 to no more than about 10 ppm isoamyl alcohol, at least about 0.001 to no more than about 10 ppm acetoin, at least about 0.0001 to no more than about 10 ppm 2-methylbutyl acetate, and a carrier, diluent or excipient. In one embodiment, the combination (iv) consists of at least 0.001 to no more than 10 ppm 1-hexanol, at least 0.001 to no more than 10 ppm isoamyl alcohol, at least 0.001 to no more than 10 ppm acetoin, at least 0.0001 to no more than 10 ppm 2-methylbutyl acetate, and a carrier, diluent or excipient.

In one embodiment the combination (iv) consists of about 0.001 to about 10 ppm 1-hexanol, about 0.001 to about 10 ppm isoamyl alcohol, about 0.001 to about 10 ppm acetoin, about 0.0001 to about 10 ppm 2-methylbutyl acetate, and a carrier, diluent or excipient. In one embodiment the combination (iv) consists of 0.001 to 10 ppm 1-hexanol, 0.001 to 10 ppm isoamyl alcohol, 0.001 to 10 ppm acetoin, 0.0001 to 10 ppm 2-methylbutyl acetate, and a carrier, diluent or excipient.

In one embodiment the combination (v) comprises or consists essentially of at least about 0.001 to no more than about 10 ppm 1-hexanol, at least about 0.001 to no more than about 10 ppm isoamyl alcohol, at least about 0.0001 to no more than about 10 ppm isobutyl acetate, and at least about 0.0001 to no more than about 10 ppm 2-methylbutyl acetate. In one embodiment the combination (v) comprises or consists essentially of at least 0.001 to no more than 10 ppm 1-hexanol, at least 0.001 to no more than 10 ppm isoamyl alcohol, at least 0.0001 to no more than 10 ppm isobutyl acetate, and at least 0.0001 to no more than 10 ppm 2-methylbutyl acetate.

In one embodiment the combination (v) comprises or consists essentially of about 0.001 to about 10 ppm 1-hexanol, about 0.001 to about 10 ppm isoamyl alcohol, about 0.0001 to about 10 ppm isobutyl acetate, and about 0.0001 to about 10 ppm 2-methylbutyl acetate. In one embodiment the combination (v) comprises or consists essentially of 0.001 to 10 ppm 1-hexanol, 0.001 to 10 ppm isoamyl alcohol, 0.0001 to 10 ppm isobutyl acetate, and 0.0001 to 10 ppm 2-methylbutyl acetate.

In one embodiment the combination (v) consists of at least about 0.001 to no more than about 10 ppm 1-hexanol, at least about 0.001 to no more than about 10 ppm isoamyl alcohol, at least about 0.0001 to no more than about 10 ppm isobutyl acetate, at least about 0.0001 to no more than about 10 ppm 2-methylbutyl acetate, and a carrier, diluent or excipient. In one embodiment, the combination (v) consists of at least 0.001 to no more than 10 ppm 1-hexanol, at least 0.001 to no more than 10 ppm isoamyl alcohol, at least 0.0001 to no more than 10 ppm isobutyl acetate, at least 0.0001 to no more than 10 ppm 2-methylbutyl acetate, and a carrier, diluent or excipient.

In one embodiment the combination (v) consists of about 0.001 to about 10 ppm 1-hexanol, about 0.001 to about 10 ppm isoamyl alcohol, about 0.0001 to about 10 ppm isobutyl acetate, about 0.0001 to about 10 ppm 2-methylbutyl acetate, and a carrier, diluent or excipient. In one embodiment the combination (v) consists of 0.001 to 10 ppm 1-hexanol, 0.001 to 10 ppm isoamyl alcohol, 0.0001 to 10 ppm isobutyl acetate, 0.0001 to 10 ppm 2-methylbutyl acetate, and a carrier, diluent or excipient.

In one embodiment the combination (vi) comprises or consists essentially of at least about 0.0001 to no more than about 10 ppm 2-methylbutyl acetate. In one embodiment the combination (vi) comprises or consists essentially of at least 0.0001 to no more than 10 ppm 2-methylbutyl acetate.

In one embodiment the combination (vi) comprises or consists essentially of about 0.0001 to about 10 ppm 2-methylbutyl acetate. In one embodiment the combination (vi) comprises or consists essentially of 0.0001 to 10 ppm 2-methylbutyl acetate.

In one embodiment the combination (vi) consists of at least about 0.0001 to no more than about 10 ppm 2-methylbutyl acetate, and a carrier, diluent or excipient. In one embodiment, the combination (vi) consists of at least 0.0001 to no more than 10 ppm 2-methylbutyl acetate, and a carrier, diluent or excipient.

In one embodiment the combination (vi) consists of about 0.0001 to about 10 ppm 2-methylbutyl acetate, and a carrier, diluent or excipient. In one embodiment the combination (vi) consists of 0.0001 to 10 ppm 2-methylbutyl acetate, and a carrier, diluent or excipient.

In one embodiment the combination (vii) comprises or consists essentially of at least about 0.001 to no more than about 10 ppm acetoin. In one embodiment the combination (vii) comprises or consists essentially of at least 0.001 to no more than 10 ppm acetoin.

In one embodiment the combination (vii) comprises or consists essentially of about 0.001 to about 10 ppm acetoin. In one embodiment the combination (vii) comprises or consists essentially of 0.001 to 10 ppm acetoin.

In one embodiment the combination (vii) consists of at least about 0.001 to no more than about 10 ppm acetoin and a carrier, diluent or excipient. In one embodiment, the combination (vii) consists of at least 0.001 to no more than 10 ppm acetoin and a carrier, diluent or excipient.

In one embodiment the combination (vii) consists of about 0.001 to about 10 ppm acetoin and a carrier, diluent or excipient. In one embodiment the combination (vii) consists of 0.001 to 10 ppm acetoin and a carrier, diluent or excipient.

In one embodiment the combination is a lure, is formulated as a lure or is provided in the form of a lure. In one embodiment the lure is a synthetic lure. In one embodiment the lure is a mammalian pest species lure, preferably a rodent lure, preferably a rat lure.

In one embodiment the lure is formulated to release the attractant compounds in the combination of the invention into the atmosphere. In one embodiment the lure releases the attractant compounds to the atmosphere as an aerosol. In one embodiment the release is a time release. Formulation of a combination of the invention into a lure that provides various time release profiles as may be desired for variable treatment environments is believed to be within the skill in the art.

In one embodiment, a lure is a solid lure, a gel lure, an emulsion lure or a liquid lure that attracts mammalian pests as described herein. In one embodiment solid lures are provided in powder form. Lures in powder form can be sprayed, poured or scattered in a treatment environment and/or on or around a treatment locus. A lure formulated as a powder may be sprayed into the atmosphere so that at least some amount of the powder adheres to at least some surfaces in a treatment environment and/or on and/or around a treatment locus. When sprayed as a powder, the lure may be applied as a coating or partial coating on a surface within a treatment environment and/or on and/or around a treatment locus. Lures in powder form may also be compressed or moulded into various shapes including but not limited to plugs, pellets, granules, blocks and bricks. In one embodiment a lure is a solid plug that provides a controlled release rate of the at least one a combination or composition of the invention. In one embodiment, the at least one of isoamyl alcohol, 1-hexanol, acetoin, isobutyl acetate and 2-methylbutyl acetate or a combination thereof is released from the solid lure upon exposure to the air or upon exposure to a gas stream.

In one embodiment the lure is a gel lure. In one embodiment the gel lure is formulated for application by squirting, spreading and/or squeezing. The gel lure may be provided as a gel, or may be provided as a liquid to be mixed with further constituents in situ to form a gel. In some embodiments the gel lure is provided as a liquid along with further constituents to be mixed in situ.

In one embodiment the lure is an emulsion lure. In one embodiment the emulsion lure is formulated for application by squirting, spreading and/or squeezing. The emulsion lure may be provided as an emulsion, or may be provided as a liquid to be mixed with further constituents in situ to form an emulsion. In some embodiments the emulsion lure is provided as a liquid along with further constituents to be mixed in situ.

In one embodiment the lure is a liquid lure. In one embodiment a liquid lure comprising a combination or composition of the invention is aqueous or non-aqueous. In one embodiment the liquid lure is applied in a treatment environment, released into a treatment environment and/or is applied onto and/or around a treatment locus as a spray. In one embodiment the spray provides the attractant compounds of the invention in an aerosol.

In some embodiments the gel, emulsion or liquid lure is applied to a substrate or support from which an attractant according to the invention is released upon exposure to the air or to a gas stream. In one embodiment the substrate is a porous substrate. In one embodiment the porous substrate is a rod, frit, bead, block, or other suitably shaped substrate that holds a liquid lure according to the invention and from which the liquid lure is released to the atmosphere.

In one embodiment the lure is an emulsion lure. In one embodiment an emulsion lure comprising a combination or composition of the invention is aqueous or non-aqueous. In one embodiment the emulsion lure is applied in a treatment environment, released into a treatment environment and/or is applied onto and/or around a treatment locus as a spray.

In one embodiment the lure is a device comprising a semi-permeable membrane, wherein the device comprises a combination or composition of the invention is aqueous or non-aqueous. In one embodiment the device is placed in a treatment environment, wherein the combination is released into a treatment environment from the device by passing from the interior of the device through the semi-permeable membrane into the treatment environment. In one embodiment the device comprises a vial with a semi-permeable membrane cover wherein the combination is contained in the vial.

In one embodiment, the liquid lure comprises a combination of the invention as set out in Table 1. Based on the disclosure herein, a skilled worker can vary the concentrations of the compounds in the combinations set out in Table 1 to optimize the liquid lure for use in different treatment environments.

Liquid lures as described herein may also be comprised in various types of sealed devices for dispensing into a treatment environment. For example, a liquid lure can be comprised in a cartridge or pressurized cartridge which allows for the controlled spray release of the lure from the cartridge as an aerosol. In one embodiment the cartridge is a spray device comprised in or disposed on a trapping device. In one embodiment the spray device is configured to provide the timed release of an aerosol that comprises a combination of the invention to the treatment environment.

Release rates of at least one of isoamyl alcohol, 1-hexanol, acetoin, isobutyl acetate and 2-methylbutyl acetate or a combination thereof from a lure as described herein are directly influenced by environmental factors including temperature, wind speed, humidity, air pressure, landscape topography, vegetation density and precipitation.

The release of a combination of the invention into the atmosphere as described herein from both liquid and solid lures is designed by the skilled worker to achieve an effective level of mammalian pest attraction over a set period of time. In some embodiments the period of time is selected from the group consisting of seconds, minutes, hours, days, weeks, months and years.

Various release rates of the combinations of the invention will be effective, the efficacy depending on the conditions present in the environment to be treated. Based on the present disclosure and in view of the conditions anticipated in the treatment environment, a skilled worker can vary the amount of the attractant compounds in the combination, as well as the chemical composition and physical form of the lure to provide a lure that provides a release rate of the combination that is designed for a particular environment or set of conditions, and that is effective at attracting mammalian pests.

Lures can be formulated to provide combination release rates that are tailored to effectively trap particular mammalian pest species. For example, when highly volatile compounds are present in the combination, the combination may be formulated as a lure using suitable carriers and provided in particular geometric shapes designed to slow volatilization, thereby increasing the duration of efficacy of the lure, but not limited thereto.

Delivery of a combination, composition or lure of the invention to a treatment locus and/or within a treatment environment to release the attractant compounds can be effected by delivering the combination, composition or lure by wicking, aerosol, dripping, ejector or static delivery. Formulation of a combination, composition or lure of the invention for delivery by wicking, aerosol, dripping, ejector, static delivery or by other means is within the skill in the art.

For example, the inventor envisions that there are three main types of delivery. In some embodiments delivery of the attractant compounds and combinations described herein is from a solid matrix. In some embodiments the solid matrix comprises rubber blocks, polyethylene tubes, polyethylene sachets, rubber wicks, impregnated ropes, emulsions and gel dispensers, including various combinations thereof. In some embodiments, delivery of the attractant compounds and combinations described herein is aerosol delivery from any device as known and used in the art. In some embodiments, aerosol delivery comprises the use of at least one reservoir dispenser.

A trapping device for capturing mammalian pest species comprising solid or liquid lures according to the invention may be chosen by a skilled worker based on the treatment environment and the environmental conditions anticipated. Many trapping devices are known in the art and may be used, adapted or re-designed to house a lure according to the invention based on the present disclosure. For example, some devices may be designed to provide one or more cartridges comprising a liquid lure as described herein, the cartridges releasing the lure via one or more adjustable apertures, but not limited thereto. In this manner, a relatively fine rate of release of the lure can be provided.

It is believed to be within the skill in the art to select and configure a lure according to the invention and choose an appropriate means of delivery that will release a combination of the invention at a predetermined rate to attract a particular mammalian pest species.

A solid lure may also be formulated with suitable biodegradable polymers and shaped or moulded into various articles. Articles may be designed to assume particular shapes that will help control the release of the combination comprised in the lure.

Many biodegradable polymers are known in the art and a suitable biodegradable polymer may be selected for various properties including, but not limited to, the suitability a particular polymer or mix of polymers for cast or extrusion moulding. Suitable biodegradable polymers may be chosen for particular decomposition profiles. Hydrolysis of these polymers overtime provides a continuous release of the combination comprised in the cast or moulded article into the treatment environment. Solid lures can be formulated with biodegradable polymers that undergo complete degradation into non-toxic, environmentally friendly compounds. In one non-limiting example, a suitable solid lure comprises polymers of poly (L (+)-lactide, polyglycolide and poly (lactide-co-glycolide) that degrade to form L(+)-lactic acid, glycolic acid, and L(+)-lactic acid, and glycolic acid, respectively.

Solid lures may be designed to vary the amount of lure surface area that is exposed to the air or to a gas stream. In this manner the degradation rate, and hence the release of the combination from the lure, can be varied to achieve release of the combination over the desired period of time. Whether the solid lure is exposed in the trapping device to air only, or to a gas stream will depend on the formulation of the lure and on the anticipated environmental conditions within the intended treatment environment.

Rates of release of the combination from the solid lure are also controlled by changing the polymer or copolymer composition used in the lure, and by changing the geometric shape of the lure vary the surface area of the lure that is exposed to the air or to a gas stream. The choice of a suitable polymer for formulating a solid lure for attracting mammalian pest species is believed to be within the skill of those in the art in view of the present disclosure and what is known in the art.

A solid lure may be prepared by various methods as known in the art. For example, a solid lure may be provided as a moulded article infused with a combination of the invention by simultaneous injection moulding of the combination according with a suitable polymer. In one embodiment the moulded article is an aromatized block.

The final shape of the lure can be designed to provide the appropriate surface area required to ensure release of the combination over time the desired period of time. In some embodiments, the injection moulding process is modified by introducing a gas into the process to produce a matrix of holes in the solid lure. The holes increase the exposed surface area comprised by the lure and allow for airflow within the lure, which can increase the rate of release of the combination. An appropriately designed solid lure comprising a matrix of holes as described herein can be designed to provide release of the combination from the lure at a continuous rate, allowing an effective level of the combination to be released from the lure over the desired period of time.

Injection moulding of a solid lure also allows the lure to be designed as an integral part of any trapping device, should that be desired. For example, a lure can be produced that provides a mechanical interface between the lure and the device, or housing within the device that holds the lure. In some non-limiting embodiments the mechanical interface is a hook, snap fitting, shaped plug, fitted plate, or other solid form that is tailored for a particular device or housing within a device. In this manner, solid lures comprising a combination of the invention can be designed for different markets that have different regulatory requirements, such as the use of particular types of trapping devices or apparatus.

In one embodiment the lure attracts mammals, preferably mammalian pest species, preferably Rodentia, preferably rats (*Rattus* spp.) or mice (*Mus*. spp). In one embodiment the mammalian pest species is a member of the Erinaceidae (hedgehogs). In one embodiment the mammalian pest species is a member of the Mustelidae, preferably a weasel, mink, badger, marten, otter, or ferret.

In one embodiment the lure attracts mammals, preferably mammalian pest species, to a treatment locus.

In one embodiment the lure attracts mammals, preferably a mammalian pest species selected from the group consisting of Rodentia, Erinaceidae and Mustelidae, preferably rats, mice, hedgehogs, weasels, minks, badgers, martens, otters or ferrets, when at least one of isoamyl alcohol, 1-hexanol, acetoin, isobutyl acetate and 2-methylbutyl acetate or any combination thereof is released to the atmosphere from the lure at the treatment locus. In one embodiment, at least two of isoamyl alcohol, 1-hexanol, isobutyl acetate and 2-methylbutyl acetate are released.

In one embodiment the lure comprises less than about 0.01 ppm of at least one of isoamyl alcohol, 1-hexanol, acetoin, isobutyl acetate and 2-methylbutyl acetate. In one embodiment the lure is configured to release the at least one of isoamyl alcohol, 1-hexanol, acetoin, isobutyl acetate and 2-methylbutyl acetate to the atmosphere from the lure over a period of time selected from the group consisting of seconds, hours, days, weeks, months and years.

In one embodiment the lure is formulated to release at least one of isoamyl alcohol, 1-hexanol, acetoin, isobutyl acetate and 2-methylbutyl acetate to the atmosphere for at least a time period selected from the group consisting of seconds, minutes, days, weeks, months, and years.

In another aspect the invention relates to a composition comprising a combination of the invention.

In one embodiment the composition comprises or consists essentially of at least about 0.0001 ppm of at least one of isoamyl alcohol, 1-hexanol, acetoin, isobutyl acetate or 2-methylbutyl acetate or any combination thereof.

In one embodiment the composition is formulated as a lure or provided in the form of a lure, preferably a synthetic lure. A skilled worker appreciates that a composition of the invention can be formulated as a lure or provided in the form of a lure as described herein for a combination of the invention, but not limited thereto.

In another aspect the invention relates to a combination or composition of the invention for use in attracting at least one mammalian pest species to treatment locus. In one embodiment the treatment locus is comprised in a treatment environment.

In one embodiment the combination or composition is for use in a treatment environment or at a treatment locus. In one embodiment the combination or composition is formulated for application to a treatment environment or a treatment locus.

In one embodiment the treatment environment is an area where mammalian pest species are found, or where mammalian pest species are suspected of being present.

In one embodiment the treatment environment is an urban, rural or wild environment.

In one embodiment the treatment environment is inside a building or other human made structure. In one embodiment the treatment environment is a house, garage, outbuilding, barn, dairy, piggery, milking shed, tool shed, cabin, factory, or storage facility.

In one embodiment the treatment environment is outside. In one embodiment the treatment environment is a field or a forest. In one embodiment the treatment environment is comprised in a field or forest. In one embodiment the treatment environment is a catchment or is comprised in a catchment.

In one embodiment a treatment environment comprises a plurality of treatment loci.

In one embodiment a treatment locus is a surface on or in an article, material or substance present in a treatment environment. In one embodiment the surface is on or in a device. In one embodiment the device is a trap.

In one embodiment the device is a trap that captures the at least one mammalian pest species.

In one embodiment the device is a trap that kills the at least one mammalian pest species.

In another aspect the invention relates to a method of making a combination or composition that attracts at least one mammalian pest species comprising formulating at least one of isoamyl alcohol, 1-hexanol, acetoin, isobutyl acetate and 2-methylbutyl acetate or any combination thereof to attract at least one mammalian pest species. In one embodiment at least one of isoamyl alcohol, 1-hexanol, acetoin, isobutyl acetate and 2-methylbutyl acetate or combination thereof is formulated with a carrier, diluent or excipient. In one embodiment the composition or combination is a synthetic composition or combination.

In one embodiment the carrier, diluent or excipient is aqueous or non-aqueous. In one embodiment the carrier is non-aqueous, preferably an oil, preferably a fractionated oil. In one embodiment the carrier is coconut oil, preferably fractionated coconut oil.

A skilled person will appreciate that many different types of aqueous and non-aqueous carriers, diluents and/or excipients may be used according to the invention. What is important in formulating a combination or composition as described herein is that the carrier, diluent or excipient stabilize the at least one of isoamyl alcohol, 1-hexanol, acetoin, isobutyl acetate and 2-methylbutyl acetate or combinations thereof in the combination or composition for a sufficient time to allow for a desired time release profile of the at least one of isoamyl alcohol, 1-hexanol, acetoin, isobutyl acetate and 2-methylbutyl acetate or any combinations thereof from the combination or composition.

In another aspect the invention relates to a method of making a lure comprising formulating a combination or composition of the invention to attract at least one mammalian pest species. In one embodiment formulating comprises combining the combination or composition with at least one additional constituent. In one embodiment the at least one additional constituent is a carrier, diluent or excipient. In one embodiment the lure is a synthetic lure.

In another aspect the invention relates to a method of making a combination or synthetic combination comprising formulating at least two, or at least three, or at least four, or all five of isoamyl alcohol, 1-hexanol, acetoin, isobutyl acetate and 2-methylbutyl acetate to attract at least one mammalian pest species.

In another aspect the invention relates to a method of making a lure comprising formulating at least two, or at least three, or at least four, or all five of isoamyl alcohol, 1-hexanol, acetoin, isobutyl acetate and 2-methylbutyl acetate to attract at least one mammalian pest species. In one embodiment at least one mammalian pest species is attracted to a treatment locus. In one embodiment formulating comprises combining 1-hexanol and 2-methylbutyl acetate. Preferably the 1-hexanol and 2-methylbutyl acetate are combined with at least one additional constituent. In one embodiment an at least one additional constituent is a carrier, diluent or excipient.

In one embodiment formulating comprises combining any of isoamyl alcohol, 1-hexanol, acetoin, isobutyl acetate and 2-methylbutyl acetate into one of the combinations as set out in Table 1, preferably by combining with at least one additional constituent. In one embodiment an additional constituent is a carrier, diluent or excipient.

In another embodiment an additional constituent is an additional active agent. In one embodiment the additional active agent is selected from the group consisting of poison, tranquilizers and anti-fertility agents. In one embodiment a combination of the invention comprising isobutyl acetate or isoamyl alcohol, including a combination of isobutyl acetate and isoamyl alcohol, is formulated with a poison that is effective at killing a mammalian pest species. Choice of such a poison for formulation with a combination of the invention as described herein is within the skill in the art. Likewise, an anti-fertility agent may be chosen, again by a skilled person in view of the invention disclosed in the present application.

Methods of Controlling Mammalian Pest Species

The inventors believe that they are the first to demonstrate a method of controlling mammalian pest species in a treatment environment using a synthetic combination or composition of the invention.

Without wishing to be bound by theory, the inventors believe that through the use of the method disclosed herein, practitioners will be able to reduce frequency, and severity of damage of, various mammalian pest species in various treatment environments, including both wild and domestic environments.

Accordingly, in another aspect the invention relates to a method of attracting at least one mammalian pest species to a treatment locus comprising placing a combination or composition of the invention near, at and/or on the treatment locus. In one embodiment the treatment locus is comprised in a treatment environment. In one embodiment the combination or composition is placed in, or near a device that controls the population of the at least one mammalian pest species. In one embodiment the combination or composition is placed within a housing in, on or near the device. In one embodiment the housing is configured to release the combination or composition from the device or into the device as an aerosol. In one embodiment the combination or composition is a synthetic combination or composition. In one embodiment the synthetic combination or composition is a synthetic lure. In one embodiment the method comprises placing the synthetic lure on and/or at the treatment locus.

In another aspect the invention relates to a method of controlling at least one mammalian pest species in a treatment environment comprising placing a combination or composition of the invention in the treatment environment. In one embodiment combination or composition is placed near, at and/or on a treatment locus comprised in the treatment environment. In one embodiment the combination or composition is placed in, on, and or near a device that controls the population of the at least one mammalian pest species. In one embodiment the combination or composition is placed in or on the device within a housing. In one embodiment the housing is configured to release the combination or composition from the device or into the device as an aerosol. In one embodiment the combination or composition is a synthetic combination or composition. In one embodiment the synthetic combination or composition is a synthetic lure as described herein comprising any one of the combinations of the invention described herein. In one embodiment the method comprises placing the synthetic lure near, at and/or on the treatment locus.

In another aspect the invention relates to the use of a combination or composition of the invention to attract least one mammalian pest species as described herein to a treatment locus.

In another aspect the invention relates to the use of a combination or composition of the invention to control the population of at least one mammalian pest species as described herein in a treatment environment.

A skilled worker appreciates that the embodiments contemplated herein for the methods of the invention related to attracting and/or controlling mammalian pest species will apply equally to the uses of the invention for attracting and/or controlling mammalian species. All such embodiments are specifically contemplated herein for the uses.

The invention will now be described by way of the following representative methods and examples which are provided to further illustrate the subject matter to which the invention relates. The use of any and all examples, or exemplary language (e.g., "such as" or "including") provided herein, is intended solely for the purposes of better describing the invention. The presence of examples and the use of exemplary language does not limit the scope of the invention as disclosed herein unless specifically otherwise indicated. No language used in the entirety of the disclosure of this application should be interpreted as indicating that any particular element or feature pertaining to the invention and as disclosed herein is essential to the practice of the invention, unless explicitly stated. For example, the skilled worker will be able to modify the quantities of reagents and processing times in the methods and processes as exemplified, as known in the art, according to the inventive concepts disclosed herein. Such modifications are considered to be within the scope of the present invention.

EXAMPLES

In the following examples, we detail the use of headspace solid phase microextraction (HS-SPME) coupled with gas chromatography-mass spectrometry (GC-MS) to identify the volatile profiles of 19 food products and a control presented to wild, free-ranging rats. The following examples demonstrate the use of partial least squares regression (PLSR) to statistically associate compounds to a behavioural response with the aim of identifying those compounds likely to elicit attraction. Also provided is a summary of the results of various bioassays using 9 statistically significant compounds identified by the PLSR analysis. To the best of the inventor's knowledge, this is the first time GC-MS data outputs and PLSR have been combined in such a way to identify semiochemicals, either allelochemical or potentially pheromone, with the aim of applying those findings to the development of a synthetic olfactory lure for attracting mammalian pest species.

Example 1—Volatile Chemical Compounds in Candidate Foods

Methodology

The following twenty products (19 foods and one control apparatus) were subjected to HS-SPME sampling and GC-MS analysis to generate a list of volatile chemical compounds found in each product: almonds, bacon, barley, black pepper, cheese (mature cheddar), chocolate (milk), chocolate (dark), coconut, coffee, egg, ginger, millet, Nutella®, pasta, peanut butter (standard), pet food (dried), rice, sardines, soap, soybean, sweetcorn, walnut and yeast. Samples were prepared 24 hours prior to analysis, with 5 g of sample added to each of 3 replicate headspace screw vials and sealed using a polytetrafluoroethylene/silicone septa screw cap (Agilent Technologies, Santa Clara, CA, USA). Sampling was undertaken using a manual SPME injection apparatus fitted with a pre-conditioned Polydimethylsiloxane/Carboxen/Divinylbenzene SPME fibre (Supelco, Sigma-Aldrich, St. Louis, MO, USA). Each sample vial was incubated in a water bath for 15 minutes with the SPME fibre then injected into the GC-MS injector port and thermally desorbed for 2 minutes. Analysis used a Shimadzu QP2010 Plus Gas Chromatograph/Mass Spectrometer fitted with an Rxi®-5-Sil MS capillary column and a Restek® SPME liner. Compounds were identified by comparison of EI fragmentation mass spectra with those contained in the NIST11 library. Those with a similarity score of >85% in at least 2 of 3 replicates were carried forward for statistical analysis. Statistically significant compounds as identified by PLSR were validated with retention indices generated by the retention times of a series of n-alkane standards (C8-C40; Sigma-Aldrich). Validated compounds were purchased from AK-Scientific (Union City, CA, USA) and Sigma Aldrich, and their identity verified by comparison of both EI fragmentation pattern and retention time.

Data Analysis

Data were subjected to partial least squares regression using Unscrambler X 10.3 (CAMO, Oslo, Norway). Analysis used the Nonlinear Iterative Partial Least Squares (NI-PALS) algorithm and was validated using random cross-validation. Martens' Uncertainty Test was used to identify the chemical compounds in analysed products that were statistical predictors of attraction. The largest peak area for each compound was used as the predictor variable while the attractiveness score for each product ((Jackson et al. 2016, Supra) was used as our response variable. All X variables were log transformed. All X and Y variables were mean centred and scaled to one standard deviation. Those compounds found only in one food product were removed from analysis as they provided no information (Wold et al. 2001).

Field Trials

Synthetic lures comprising a single compound mixed in a carrier medium (fractionated coconut oil) were presented to wild, free-ranging rats at 7 concentrations, decreasing in orders of magnitude from 10,000 ppm to 0.01 ppm. The compounds and concentrations used are set out in Table 2. Lures were presented in 1.7 mL Eppendorf microtubes secured to the inside wall of tracking tunnels using a cable tie. Inked cards were placed in each tunnel to quantify the visitation and identity of species visiting lures. Lures were randomly assigned along transects, with a minimum 25-m spacing between lures and with transects separated by 200 m. A control (fractionated coconut oil only) and standard (peanut butter) were assigned to each transect, with each transect comprising of lures presented at the same concentration. The order of transects was randomised for each trial. All lures were left in situ for one rain-free night. Lures were scored using the presence of rat tracks on inked cards to provide a proportion of inked cards receiving a visit for each lure, hereafter termed the "tracking rate". Binomial tests were used to compare the tracking rate of each individual lure against peanut butter at the end of the trial period. Binomial tests were run in R (R Core Team 2013). Ten trials were undertaken at independent sites across the Wainuiomata and Orongorongo catchment region and within the Akatarawa and Pakuratahi Forest Parks, Wellington region (41° 15S, 175° 00E), New Zealand between 15 Jul. 2015 and 11 Nov. 2015.

TABLE 2

Compounds to be trialed and the unique identifier code provided each compound based on each of the seven concentrations trialed from 10,000 to 0.01 ppm.

| Compound | Compound Code | Concentration-specific code based on ppm | | | | | | |
|---|---|---|---|---|---|---|---|---|
| | | 10000 1 | 1000 2 | 100 3 | 10 4 | 1 5 | 0.1 6 | 0.01 7 |
| Isoamyl alcohol | A | A1 | A2 | A3 | A4 | A5 | A6 | A7 |
| 1-Hexanol | B | B1 | B2 | B3 | B4 | B5 | B6 | B7 |
| Acetoin | C | C1 | C2 | C3 | C4 | C5 | C6 | C7 |
| Isopentanoic acid | D | D1 | D2 | D3 | D4 | D5 | D6 | D7 |
| 2,3-Dimethylpyrazine | E | E1 | E2 | E3 | E4 | E5 | E6 | E7 |
| Isobutyl acetate | F | F1 | F2 | F3 | F4 | F5 | F6 | F7 |
| Isopentyl acetate | G | G1 | G2 | G3 | G4 | G5 | G6 | G7 |
| Tetramethylpyrazine | H | H1 | H2 | H3 | H4 | H5 | H6 | H7 |
| 2-Methylbutyl acetate | I | I1 | I2 | I3 | I4 | I5 | I6 | I7 |

Results—Field Trials

GC-MS analysis characterised 375 compounds across the 20 sampled products, 111 of which were found in 2 or more of the analysed products and carried forward to PLSR analysis. Partial least squares regression identified 63 compounds that were positively correlated to the response variable, with 10 compounds identified as statistically significant predictors. Statistically significant compounds were derived using the first two factors of the PLSR model that together explained 91% of the validated variance in the dataset (FIG. 1). Model cross-validation for the two factors was r2=0.54. Of the 10 statistically significant compounds, the identities of 9 were positively verified using authentic standards and carried forward to field trials while the 10th compound was not commercially available for testing (Table 3).

TABLE 3

Positive verification of compounds by comparison to authentic standards.

| Compound | LRI[a] | LRI[b] | LRI Reference | Compound ID |
|---|---|---|---|---|
| Isoamyl alcohol | 705 | 732 | Steinhaus and Schieberle (2007) | A |
| 1-Hexanol | 814 | 858 | Andrade et al. (2008) | B |
| Acetoin | 696 | 705 | Beal and Mottram (1994) | C |
| Isopentanoic acid | 801 | 848 | Wu et al. (2005) | D |
| 2,3-dimethylpyrazine | 871 | 915 | Beal and Mottram (1994) | E |
| Isobutyl acetate | 730 | 758 | Shimoda et al. (1993) | F |
| Isopentyl acetate | 826 | 855 | Boscaini et al. (2003) | G |
| Tetramethylpyrazine | 1077 | 1075 | Avsar et al. (2004) | H |
| 2 Methylbutyl acetate | 828 | 863 | Guichard and Souty (1988) | I |

Table 3. Compounds identified as statistically significant predictors for rats as identified by the PLSR model and ordered by LRI. (1) LRI[a]=calculated from the analysis retention time relative to the retention times of a series of n-alkanes ($C_8$-$C_{40}$) using our GC-MS. (2) LRI[b]=LRI obtained from published literature using data obtained from a comparable DB5 column. ID code: Letter coding provided to each compound during testing.

Field Trials

Figure 2:
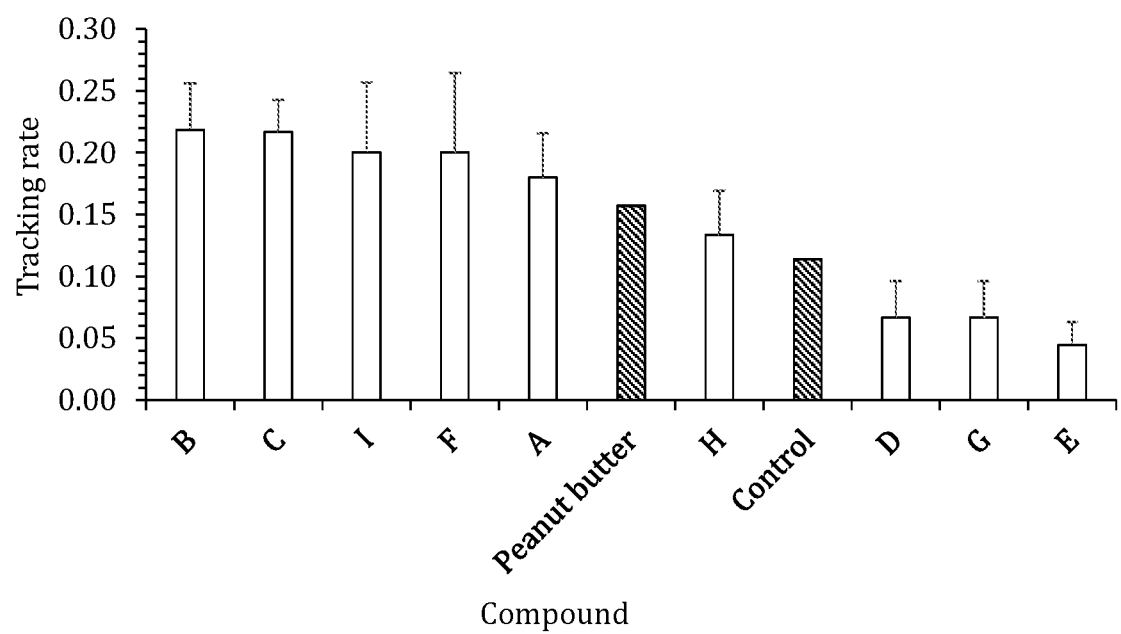
FIG. 2. Tracking rate for each compound (letter codes as shown in Table 3), control and standard. The tracking rate for each compound is presented as the aggregated tracking rate for all seven concentrations of that compound. The peanut butter standard and the control are shown hatched to provide visual differentiation. Compound tracking rates provided ±1SE.
Figure 3:
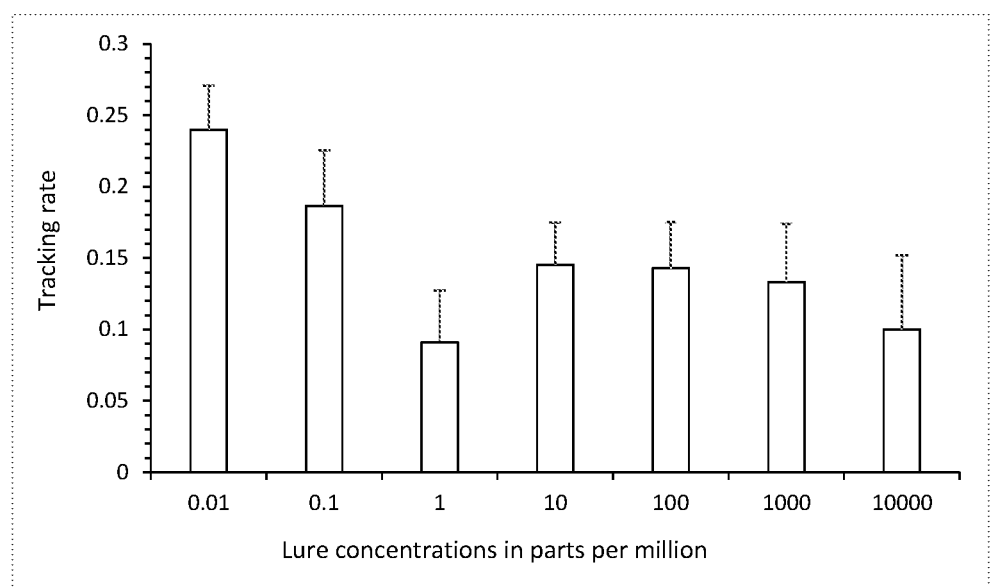
FIG. 3. Tracking rates for all compounds aggregated based on concentration. Tracking rates are provided ±1SE. A statistically significant relationship between aggregated concentration data and tracking rate was identified ($X^2=7.01$, df=1, P=0.008).

Five compounds (1-hexanol, acetoin, 2-methylbutyl acetate, isobutyl acetate and isoamyl alcohol) were more attractive than the peanut butter standard, one compound (H) was less attractive than the peanut butter standard but more attractive than the control, and 3 compounds (D, G, and E) were less attractive than the peanut butter standard and the control (FIG. 2). Eight individual lures statistically outperformed the peanut butter standard (p<0.01), with all 8 coming from the 5 top-performing compounds. Attraction to compounds was highest at the 2 lowest concentrations, with nearly half of all recorded visits occurring with lures presented at 0.1 ppm and 0.01 ppm (tracking rates 0.19 and 0.24, respectively). The lowest recorded tracking rate (0.09) was for lures presented at 1 ppm (FIG. 3). With the exception of compound G (no trend), attraction to individual compounds showed an increasing trend with decreasing concentration and a statistically significant inverse relationship between aggregated concentration data and tracking rate was identified ($X^2$=7.01, df=1, P=0.008).

Example 2—Blend Trials

Materials and Methods

Lure preparation and presentation methods followed those outlined above.

Trial Design

For Phase One, A6, B6, C6, F7 and I7 identified as in Table 2 were presented. The five lures were also used to create all 10 possible dyad blend combinations (as shown in Table 1). For example, A6 and B6 were blended together in equal parts to make a dyad lure coded AB. Each trial consisted of a single spatially stratified transect. Each strata contained one of each lure, a control (FCO) and the standard (peanut butter). The number of transect strata varied between trials according to site conditions i.e., track length and accessibility. Lures were spaced at 50 m, with the order of lures randomised within transect strata and between each trial. All lures were left in situ for two rain-free night. Ten trials were undertaken at independent sites across the Greater Wellington region and Richmond Range, Nelson, New Zealand between 11 Nov. 2015 and 25 Feb. 2016.

For Phase Two, the best performing single and dyad lures identified after Phase One were presented. In addition, all possible triad, tetrad and pentad blend combinations of A, B, C, F and I were created and trialled. For example, A6, B6, C6 and F7 were blended together in equal parts and at their relative concentrations to create a tetrad lure coded ABCF. The transect design followed that for Phase Three. Ten trials were undertaken at independent sites across the Greater Wellington region, New Zealand between 30 Mar. 2016 and 7 Jul. 2016.

Response Variables

Trials were designed to compare the performance of each lure relative to the best performing lure after each successive trial phase. The elimination of poorer performing lures allowed for higher levels of internal replication and the inclusion of additional multi-component blend lures to Phase Two. Lures were scored using the presence/absence of rat tracks on inked tracking cards to provide a proportion of tracking cards receiving species-specific visitations and hereafter termed the 'tracking rate'. The tracking rate was used to direct the elimination process. Lures that were statistically less attractive than the best performing lure after Phase One trials were eliminated from subsequent trials. Three behavioural response variables were scored that were designed to quantify the strength of the visit to the respective lure: (1) the presence of urination and/or faecal marking in or on the tracking tunnel and hereafter termed 'Marking'; (2) the presence of chew or bite marks on the microtube and/or tracking tunnel and hereafter termed 'Contact' and; (3) the amount of footprints on each tracking card that received a visitation. This was measured using a 10 cm×47 cm Perspex sheet with a grid made up of 1 $cm^2$ squares. The number of squares with species-specific tracks was calculated to provide a score, hereafter termed 'Intensity'. Intensity was designed to identify lures that generated intensive or multiple visits by an individual or that elicited visits from multiple individuals.

Model Selection

A multi-model information-theoretic approach was used at the end of Phase Two to identify the models of best fit for each of the four response variables (Tracking, Marking, Contact and Intensity) and to investigate possible synergistic effects between compounds used in multi-component blends. Data for each lure comprising one or any combination of A6, B6, C6, F7 and/or 17 were collated. Model averaging was used to identify each compounds relative importance to each response variable. Given the final five compounds (predictor variables) presented in this study had already been shown to be biologically important to rats, all possible additive and interactive models were generated with all second, third and fourth-order interactive term combinations based on the predictor variables.

Data Analysis

Binomial tests were used to compare the performance of each lure to the best performing lure at the end of each in-field trial phase and drive the process. Tracking, Marking and Contact models were run as generalised linear mixed-effects models (GLMM) with a binomial distribution and logit link and a linear mixed-effects model (LMM) for Intensity. The presence/absence of compounds in each lure were used as predictor variables.

A 'Global' model was firstly generated containing all fixed-effect parameters, with 'Site' and/or 'Transect' and/or 'Trial Phase" included as random effects. This allowed for the examination of both spatial (Site and Transect) and temporal (Trial Phase) impacts on the data. 'Transect' nested within 'Site' and 'Trial Phase' provided an improved model fit compared to any other random effect model, therefore all models were run with the inclusion of 'Transect' nested within 'Site' and 'Trial Phase" as random effects. Akaike's information criterion corrected for small sample size (AICc) was used to compare models. Corresponding Akaike differences ($\Delta i$), the number of parameters (K), Akaike weights (Wi) and log-likelihoods (LL) were also calculated. As the model set was not balanced i.e., there were not equal numbers of models for each variable a cut-off of 10AICC was used (Bolker et al. 2009) to create the model averaging candidate model-sets from the relative importance of variables were derived. Correlations between the response variables used in linear regression models were examined using Dice's similarity coefficient (QS) due to the binary nature of three of the four variables (Choi et al. 2010).

Statistical significance was assumed wherever $P \leq 0.05$. All statistical analysis was run in R (R Core Team 2016), with package lme4 (Bates et al. 2015) used for mixed-effects models and MuMIn (Barton 2016) used for AICc scores, weights, deltas, log-likelihoods and model averaging (using the dredge function).

Results

Trial Eliminations

In Phase One, fifteen compound-based lures (five single compound lures and 10 dyad lures) were trialled at 10 sites (n=30 per lure). The dyad lure CF was the top performing lure, with a tracking rate of 0.27. The top performing single compound was C with a tracking rate of 0.20. The tracking rate for the control and peanut butter standard were 0.07 and 0.17, respectively. No lure statistically outperformed peanut butter during this phase of trials. It is of note that Phase One trials were run over the summer months and that visitations to and interactions with lures were, on the whole, low. Six lures (B, F, AC, AF, BC and CI) were statistically weaker than the top performing lure of CF (P<0.03) and were eliminated from Phase Four trials.

Figure 4:
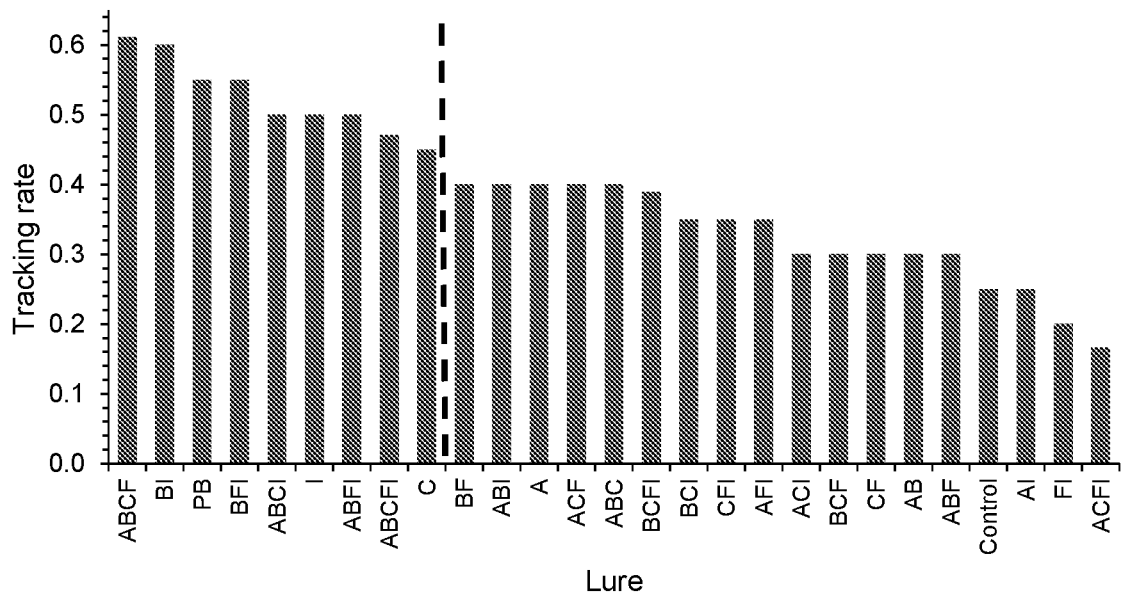
FIG. 4. Tracking rate for lures presented after Phase Four. Lures to the right of the dotted line were statistically poorer ($P \leq 0.046$) than the top performer (ABCF). The tracking rate for the control and standard (peanut butter (PB)) were 0.25 and 0.55, respectively. Both are hatched for differentiation.

In Phase Two the best performing single and dyad lures identified from Phase One were presented. Phase Two trials also included all possible triad, tetrad and pentad multi-component blend lures comprised of the five compounds. In total, 25 compound-based lures were presented at 10 sites (n=18 for the tetrad and pentad lures and n=20 for the single, dyad and triad lures). The tetrad lure ABCF was the top performing lure, with a tracking rate of 0.61 while BI and BFI were the second and third best performing lures, with tracking rates of 0.60 and 0.55, respectively. Seventeen lures were statistically weaker than the best performer (P≤0.046), while seven lures were statistically no different from the top performer (FIG. 4). The tracking rate for the control and peanut butter standard were 0.25 and 0.55, respectively.

Model Selection

Five lures (A6, B6, C6, F7, and 17) were used as the main effect and hereafter simply termed A, B, C, F and I. All the tracking cards that were presented for the single lures or any combination of the five lures were included in our analysis.

Visitation

The interactive model B+I+(B*I) was identified as the model of best fit for Visitation (Table 4), with the second order interactive term B*I appearing in seven of the nine substantially supported Visitation models (where Akaike differences ≤2). The only single variable model with substantial support was B ($\Delta i$=1.07). Model averaging also identified the variable B as the having the highest relative importance of all variables (0.90), with I the second most important variable (0.84). The interactive term B*I was the fifth most important variable (0.67), just behind A (0.69) and F (0.70). The variable C was sixth with a relative importance of just 0.58.

TABLE 4

Visitation models are presented in descending order based on Akaike differences ($\Delta_i$). The table includes only the substantially supported models where Akaike differences ≤ 2.

| Model | K | AIC$_c$ | $\Delta_i$ | LL |
|---|---|---|---|---|
| **B + I + (B*I) | 7 | 1019.51 | 0.00 | −502.70** |
| B + F + I + (B*I) + (F*I) | 9 | 1020.09 | 0.58 | −500.95 |
| A + B + I + (A*B) + (B*I) | 9 | 1020.58 | 1.07 | −501.20 |
| B | 5 | 1020.58 | 1.07 | −505.26 |
| A + B + F + I + (A*B) + (B*I) + (F*I) | 11 | 1020.70 | 1.19 | −499.21 |
| Random effects only model | 4 | 1020.79 | 1.28 | −506.37 |
| A + B + I + (B*I) | 8 | 1021.14 | 1.63 | −502.50 |
| B + C + I + (B*I) | 8 | 1021.41 | 1.89 | −502.63 |
| B + F + I + (B*I) | 8 | 1021.48 | 1.97 | −502.67 |

Akaike's information criterion corrected for sample size (AIC$_c$), the number of parameters (K), log-likelihood (LL) and Akaike weights ($W_i$) are provided. The model of best fit (i.e., $\Delta$AIC = 0) is in bold. Interactive terms are indicated using "*" while additive terms are indicated using "+".

Contact

The single variable model F was identified as the model of best fit for Contact (Table 5) and also appears in five of the seven substantially supported models, both as an additive and second-order interactive term. However, it is of note that the random effects model ranked highly, with a $\Delta_i$=0.69. Model averaging identified the variable F as the having the highest relative importance of all variables (0.78), with A the second most important (0.68). Both variables B and C had a relative importance of 0.50 while the variable I had the lowest relative importance of single variables (0.48). Quite a drop then to the next most important variable of A*F of 0.23.

TABLE 5

Contact models are presented in descending order based on Akaike differences ($\Delta_i$) and include only the substantially supported models where Akaike differences ≤ 2.

| Model | K | AIC$_c$ | $\Delta_i$ | LL |
|---|---|---|---|---|
| F | 4 | 391.64 | 0.00 | −191.80 |
| A + F | 5 | 391.98 | 0.34 | −190.96 |

TABLE 5-continued

Contact models are presented in descending order based on Akaike differences ($\Delta_i$) and include only the substantially supported models where Akaike differences ≤ 2.

| Model | K | AIC$_c$ | $\Delta_i$ | LL |
|---|---|---|---|---|
| Random effects only model | 3 | 392.33 | 0.69 | −193.15 |
| A + F + (A*F) | 6 | 392.81 | 1.17 | −190.36 |
| A | 4 | 393.18 | 1.54 | −192.57 |
| C + F | 5 | 393.53 | 1.89 | −191.73 |
| F + I | 5 | 393.62 | 1.99 | −191.78 |

The table description follows that for Table 4

Marking

The model A+B+C+F+I+(A*B)+(C*F)+(C*I) containing all main effects and three second-order interactive terms was identified as the model of best fit for Marking (Table 6). The same model containing all five main effects appears in 11 of the 14 substantially supported models with a range of different second and third-order interactive terms. Model averaging identified the variable C as the having the highest relative importance of all variables (0.96), with A, B and I joint second (0.95). Variable F had a relative importance of 0.987. The second order interactive terms C*I, A*B and C*F where the highest scoring interactive terms, with a relative importance of 0.84, 0.72 and 0.70, respectively, with a large drop to 0.48 to the next F*I.

TABLE 6

Marking models are presented in descending order based on Akaike differences ($\Delta_i$) and include only the substantially supported models where Akaike differences ≤ 2. The random effects-only model is shown for reference.

| Model | K | AIC$_c$ | $\Delta_i$ | LL |
|---|---|---|---|---|
| A + B + C + F + I + (A*B) + (C*F) + (C*I) | 12 | 747.50 | 0.00 | −361.59 |
| A + B + C + F + I + (A*B) + (C*F) + (C*I) + (F*I) | 13 | 747.87 | 0.37 | −360.75 |
| A + B + C + F + I + (A*B) + (B*I) + (C*F) + (C*I) | 13 | 748.16 | 0.66 | −360.89 |
| A + B + C + F + I + (A*B) + (C*F) + (C*I) + (F*I) + (C*F*I) | 14 | 748.36 | 0.86 | −359.96 |
| A + B + C + I + (A*B) + (C*I) | 10 | 748.42 | 0.92 | −364.10 |
| A + B + C + F + I + (A*B) + (B*I) + (C*F) + (C*I) + (F*I) | 14 | 748.63 | 1.13 | −360.10 |
| A + B + C + I + (A*B) + (B*I) + (C*I) | 11 | 749.05 | 1.55 | −363.39 |
| A + B + C + F + I + (C*F) + (C*I) | 11 | 749.13 | 1.63 | −363.43 |
| A + B + C + I + (C*I) | 9 | 749.17 | 1.67 | −365.49 |
| A + B + C + F + I + (A*B) + (B*I) + (C*F) + (C*I) + (F*I) + (C*F*I) | 15 | 749.19 | 1.69 | −359.35 |
| A + B + C + F + I + (A*B) + (A*C) + (C*F) + (C*I) | 13 | 749.25 | 1.75 | −361.44 |
| A + B + C + F + I + (A*B) + (B*C) + C*F) + (C*I) | 13 | 749.42 | 1.92 | −361.52 |
| A + B + C + F + I + (A*B) + (A*C) + (C*F) + (C*I) + (F*I) | 14 | 749.42 | 1.92 | −360.50 |
| A + B + C + F + I + (A*B) + (A*F) + (C*F) + (C*I) | 13 | 749.46 | 1.96 | −361.54 |
| Random effects only model | 4 | 752.06 | 4.56 | −372.01 |

The table description follows that for Table 4

Intensity

Figure 5:
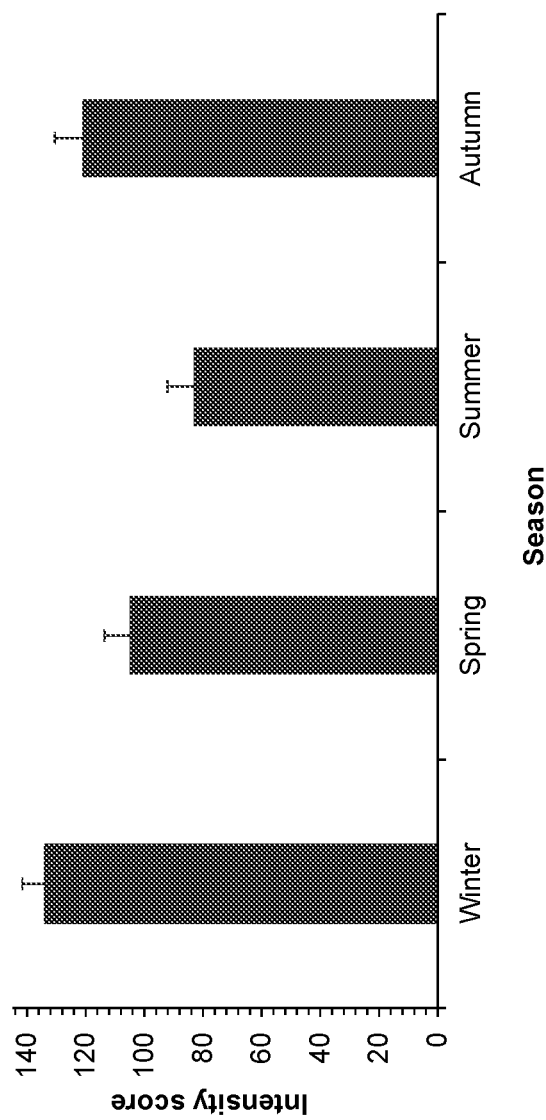
FIG. 5: Mean Intensity scores for lures presented based on season. A statistically significant difference between winter and summer (P=0.009) was identified.

The random effects-only model was identified as the model of best fit for Intensity (Table 7). However, further investigation identified a strong influence of the random effect "Phase" that suggested a significant temporal impact on the data. The inventors therefore analysed Intensity data aggregated based on season (FIG. 5) and identified a statistically significant difference (H=9.048, df=3, P=0.045) with Dunn's post-hoc test identifying a statistically significant difference between Winter and Summer (P=0.009). The inventors therefore removed Phase as a random effect (keeping Site and Transect) and re-ran the models.

TABLE 7

Intensity models are presented in descending order based on Akaike differences ($\Delta_i$) and include only the substantially supported models where Akaike differences ≤ 2.

| Model | K | $AIC_c$ | $\Delta_i$ | LL |
|---|---|---|---|---|
| Random effects only model | 5 | 11058.31 | 0.00 | −5524.12 |
| C | 6 | 11058.91 | 0.60 | −5523.41 |
| B | 6 | 11059.90 | 1.59 | −5523.91 |
| F | 6 | 11059.98 | 1.67 | −5523.95 |
| C + I | 8 | 11060.06 | 1.75 | −5521.95 |
| A | 6 | 11060.08 | 1.77 | −5524.00 |
| I | 6 | 11060.30 | 2.00 | −5524.11 |

The table description follows that for Table 4

The model A+B+C+F+I+(C*F)+(C*I)+(F*I)+(C*F*I) containing all main effects, three second-order interactive terms and one third order interactive term was identified as the model of best fit for Intensity (Table 8). All five main effects appear in seven of the top ten models, with a range of second and third order interactive effects. Interestingly the same main five main effects and second order interactive terms identified for Intensity mirror closely the models of best fit for Marking (Table 6). The single variable model C was identified as the top ranked single variable model with $\Delta_i$=0.45. Of note, however, is the ranking for the random effects-only model with $\Delta_i$=0.78.

Model averaging identified the variable C as the having the highest relative importance to Intensity (0.94), with B second (0.89). Variable I, F and A had a relative importance of 0.88, 0.86 and 0.85, respectively. The highest ranked interactive term was C*I with a relative importance of 0.68 and can be found as an interactive term in the model of best fit and eight of the top ten models.

TABLE 8

Intensity models are presented in descending order based on Akaike differences ($\Delta_i$) and include only the substantially supported models where Akaike differences ≤ 2.

| Model | K | $AIC_c$ | $\Delta_i$ | LL |
|---|---|---|---|---|
| A + B + C + F + I + (C*F) + (C*I) + (F*I) + (C*F*I) | 13 | 11082.09 | 0.00 | 5527.86 |
| A + B + C + F + I + (A*B) + (C*F) + (C*I) + (F*I) + (C*F*I) | 14 | 11082.51 | 0.42 | −5527.04 |
| C | 5 | 11082.55 | 0.45 | −5536.24 |
| A + B + C + F + I + (B*I) + (C*F) + (C*I) + (F*I) + (C*F*I) | 14 | 11082.62 | 0.52 | −5527.09 |
| A + B + C + F + I + (A*B) + (B*I) + (C*F) + (C*I) + (F*I) + (C*F*I) | 15 | 11082.85 | 0.75 | −5526.18 |
| Random effects only model | 4 | 11082.87 | 0.78 | −5537.42 |
| A + B + C + F + I + (B*F) + (C*F) + (C*I) + (F*I) + (C*F*I) | 14 | 11083.04 | 0.95 | −5527.3 |
| A + B + C + F + I + (C*I) | 10 | 11083.05 | 0.95 | −5531.41 |
| B + C + F + I + (C*F) + (C*I) + (F*I) + (C*F*I) | 12 | 11083.08 | 0.98 | −5529.38 |
| A + B + C + F + I + (B*F) + (B*I) + (C*F) + (C*I) + (F*I) + (C*F*I) | 15 | 11083.1 | 1.01 | −5526.3 |
| A + B + C + F + I + (A*B) + (B*F) + (B*I) + (C*F) + (C*I) + (F*I) + (C*F*I) | 16 | 11083.17 | 1.08 | −5525.31 |
| B + C | 6 | 11083.27 | 1.18 | −5535.59 |
| A + B + C + (A*B) | 8 | 11083.3 | 1.21 | −5533.57 |
| B + C + F + I + (B*F) + (B*I) + (C*F) + (C*I) + (F*I) + (C*F*I) | 14 | 11083.32 | 1.23 | −5527.45 |
| A + C | 6 | 11083.33 | 1.24 | −5535.62 |
| A + B + C + F + I + (A*B) + (B*F) + (C*F) + (C*I) + (F*I) + (C*F*I) | 15 | 11083.36 | 1.27 | −5526.43 |
| B + C + F + I + (B*I) + (C*F) + (C*I) + (F*I) + (C*F*I) | 13 | 11083.36 | 1.27 | −5528.49 |
| A + B + C + F + I + (C*I) + (F*I) | 11 | 11083.51 | 1.42 | −5530.62 |
| A + B + C + F + I + (A*B) + (C*I) | 11 | 11083.54 | 1.45 | −5530.63 |
| A + B + C + I + (C*I) | 9 | 11083.58 | 1.49 | −5532.7 |
| B + C + F + I + (B*F) + (C*F) + (C*I) + (F*I) + (C*F*I) | 13 | 11083.59 | 1.50 | −5528.61 |
| A + B + C + F + I + (B*I) + (C*I) | 11 | 11083.61 | 1.52 | −5530.67 |
| A + B + C + I + (A*B) + (C*I) | 10 | 11083.67 | 1.58 | −5531.72 |
| C + F | 6 | 11083.73 | 1.64 | −5535.82 |
| A + B + C + F + I + (A*B) + (C*I) + (F*I) | 12 | 11083.75 | 1.65 | −5529.71 |
| A + C + F + I + (C*F) + (C*I) + (F*I) + (C*F*I) | 12 | 11083.75 | 1.66 | −5529.71 |
| A + B + C + F + I + (A*I) + (C*F) + (C*I) + (F*I) + (C*F*I) | 14 | 11083.79 | 1.70 | −5527.68 |
| A + B + C | 7 | 11083.82 | 1.72 | −5534.85 |
| B | 5 | 11083.86 | 1.77 | −5536.9 |
| C + F + (C*F) | 7 | 11083.87 | 1.78 | −5534.88 |
| C + F + I + (C*F) + (C*I) + (F*I) + (C*F*I) | 11 | 11083.89 | 1.79 | −5530.81 |
| A + B + C + F + I + (A*B) + (B*I) + (C*I) | 12 | 11083.89 | 1.80 | −5529.79 |
| B + C + I + (C*I) | 8 | 11083.9 | 1.81 | −5533.88 |
| A + B + C + F + I + (A*C) + (C*F) + (C*I) + (F*I) + (C*F*I) | 14 | 11084 | 1.91 | −5527.78 |
| A + B + C + F + I + (C*F) + (C*I) | 11 | 11084.01 | 1.92 | −5530.87 |
| A + B + C + F + I + (A*F) + (C*F) + (C*I) + (F*I) + (C*F*I) | 14 | 11084.06 | 1.96 | −5527.81 |
| A + B + C + F + I + (A*B) + (A*I) + (C*F) + (C*I) + (F*I) + (C*F*I) | 15 | 11084.07 | 1.98 | −5526.79 |

It is not the intention to limit the scope of the invention to the abovementioned examples only. As would be appreciated by a skilled person in the art, many variations are possible without departing from the scope of the invention (as set out in the accompanying claims).

REFERENCES

Andrade A J, Andrade M R, Dias E S, et al (2008) Are light traps baited with kairomones effective in the capture of *Lutzomyia longipalpis* and *Lutzomyia intermedia*? An evaluation of synthetic human odor as an attractant for phlebotomine sand flies (Diptera: Psychodidae: Phlebotominae). Mem Inst Oswaldo Cruz 103:337-343. doi: 10.1590/50074-02762008000400004

Apfelbach R, Blanchard C D, Blanchard R J, et al (2005) The effects of predator odors in mammalian prey species: A review of field and laboratory studies. Neurosci Biobehav Rev 29:1123-1144. doi: 10.1016/j.neubiorev.2005.05.005

Avsar Y K, Karagul-Yuceer Y, Drake M A, et al (2004) Characterization of Nutty Flavor in Cheddar Cheese. J Dairy Sci 87:1999-2010. doi: 10.3168/jds.S0022-0302(04)70017-X Barton K (2016) Mullin: Multi-Model Inference. R package version 1.15.6. https://CRAN.R-project.org/package=MuMIn.

Bates D, Maechler M, Bolker B, Walker S (2015) Fitting Linear Mixed-Effects Models Using lme4. J Stat Softw 67:1-48.

Beal A D, Mottram D S (1994) Compounds contributing to the characteristic aroma of malted barley. J Agric Food Chem 42:2880-2884. doi: 10.1021/jf00048a043

Bolker B M, Brooks M E, Clark C J, et al (2009) Generalized linear mixed models: a practical guide for ecology and evolution. Trends Ecol Evol 24:127-135. doi: 10.1016/j.tree.2008.10.008

Boscaini E, van Ruth S, Biasioli F, et al (2003) Gas Chromatography-Olfactometry (GC-O) and Proton Transfer Reaction-Mass Spectrometry (PTR-MS) Analysis of the Flavor Profile of Grana Padano, Parmigiano Reggiano, and Grana Trentino Cheeses. J Agric Food Chem 51:1782-1790. doi: 10.1021/jf020922g Cammack R, Atwood T, Campbell P, et al (eds) (2006) Oxford Dictionary of Biochemistry and Molecular Biology, 2nd edn. Oxford University Press, Oxford Choi S-S, Cha S-H, Tappert C (2010) A Survey of Binary Similarity and Distance Measures. Sytemics Cybern Inform 8:43-48.

Guichard E, Souty M (1988) Comparison of the relative quantities of aroma compounds found in fresh apricot (*Prunus armeniaca*) from six different varieties. Z Für Lebensm-Unters Forsch 186:301-307. doi: 10.1007/BF01027031

Hubschmann H-J (2015) Handbook of GC-MS: Fundamentals and Applications, 3rd edn. Wiley Hunt P J, Richards A M, Nicholls M G, et al (1997) Immunoreactive amino-terminal pro-brain natriuretic peptide (NT-PROBNP): a new marker of cardiac impairment. Clin Endocrinol (Oxf) 47:287-296. doi: 10.1046/j.1365-2265.1997.2361058.x Jackson M, Hartley S, Linklater W (2016) Better food-based baits and lures for invasive rats *Rattus* spp. and the brushtail possum *Trichosurus vulpecula*: a bioassay on wild, free-ranging animals. J Pest Sci 89:479-488. doi: 10.1007/s10340-015-0693-8

Kok A D, Parker D M, Barker N P (2013) Rules of attraction: the role of bait in small mammal sampling at high altitude in South Africa. Afr Zool 48:84-95.

Linklater W, Greenwood D, Keyzers R, et al (2013) Pied-pipers wanted: The search for super-lures of New Zealand mammal pests. N Z Sci Rev 7:31-36.

Metcalf R, Metcalf E (1992) Plant Kairomones in Insect Ecology and Control. Routledge, Chapman and Hall, London Murphy E, Sjoberg T, Barun A, et al (2014) Development of re-setting toxin delivery devices and long-life lures for rats. In: Proceedings of the 26th Vertebrate Pest Conference. University of California Davis, pp 396-399

Parshad V R (2002) Carbon disulphide for improving the efficacy of rodenticide baiting and trapping of the house rat, *Rattus rattus* L. Int Biodeterior Biodegrad 49:151-155. doi: 10.1016/S0964-8305(02)00041-0

Pawliszyn J (1997) Solid Phase Microextraction: Theory and Practice. John Wiley & Sons, New York Pawliszyn J (ed) (1999) Applications of Solid Phase Microextraction. Royal Society of Chemistry R Core Team (2013) R: A language and environment for statistical computing. R Foundation for Statistical Computing, Vienna, Austria.

R Core Team (2016) R: A language and environment for statistical computing. R Foundation for Statistical Computing, Vienna, Austria.

Rosell F, Kvinlaug J (1998) Methods for live-trapping beaver (Castor spp.). Fauna Nor Ser A 19:1-28.

Shimoda M, Shibamoto T, Noble A C (1993) Evaluation of headspace volatiles of cabernet sauvignon wines sampled by an on-column method. J Agric Food Chem 41:1664-1668. doi: 10.1021/jf00034a028

Steinhaus P, Schieberle P (2007) Characterization of the Key Aroma Compounds in Soy Sauce Using Approaches of Molecular Sensory Science. J Agric Food Chem 55:6262-6269. doi: 10.1021/jf0709092

Wild D (2013) The Immunoassay Handbook: Theory and Applications of Ligand Binding, ELISA and Related Techniques, 4th edn. Elsevier Science Witzgall P, Kirsch P, Cork A (2010) Sex Pheromones and Their Impact on Pest Management. J Chem Ecol 36:80-100. doi: http://dx.doi.org.helicon.vuw.ac.nz/10.1007/s10886-009-9737-y Wu S, Zorn H, Krings U, Berger R G (2005) Characteristic Volatiles from Young and Aged Fruiting Bodies of Wild *Polyporus sulfureus* (Bull.:Fr.) Fr. J Agric Food Chem 53:4524-4528. doi: 10.1021/jf0478511

What we claim is:

1. A method for attracting wild free ranging rodents to a treatment locus comprising:
    (i) placing at the treatment locus a synthetic combination consisting of at least two attractant compounds, wherein:
        the at least two attractant compounds are selected from the group consisting of isoamyl alcohol, 1-hexanol, acetoin, isobutyl acetate and 2-methylbutyl acetate, and
        the combination attracts wild free ranging rodents; and
    (ii) attracting the wild free ranging rodents to the treatment locus.

2. The method of claim 1, wherein the rodent is a rat.

3. The method of claim 1, wherein the method further comprises combining the synthetic combination with a carrier, diluent or excipient, and forming an aerosol, a liquid, an oil, a gel, a powder, an emulsion, a stick, a block, a pad, a sheet, a tablet, a pellet, a ball, a rod, a granule, a capsule, a filament, a rope, a line, a twine, a string, or a combination thereof.

4. A method for attracting a wild free ranging rodents to a treatment locus comprising:
    (a) placing at a treatment locus a synthetic combination of at least two attractant compounds chosen from isoamyl alcohol, 1-hexanol, acetoin, isobutyl acetate, and 2-methylbutyl acetate, or any combination thereof; and
    (b) attracting the wild free ranging rodents to the treatment locus.

5. The method of claim 4, wherein the synthetic combination of the at least two compounds is chosen from:
    i. 1-hexanol and 2-methylbutyl acetate,
    ii. 1-hexanol, isobutyl acetate, and 2-methylbutyl acetate,
    iii. 1-hexanol, isobutyl acetate, isoamyl alcohol, and acetoin,
    iv. 1-hexanol, isoamyl alcohol, acetoin, and 2-methylbutyl acetate,
    v. 1-hexanol, isoamyl alcohol, isobutyl acetate, and 2-methylbutyl acetate, and
    vi. 1-hexanol, isoamyl alcohol, isobutyl acetate, acetoin, and 2-methylbutyl acetate.

6. The method of claim 4, wherein the rodent is a rat.

7. The method of claim 4, wherein the synthetic combination is formulated with a carrier, diluent or excipient as an aerosol, a liquid, an oil, a gel, a powder, an emulsion, a stick, a block, a pad, a sheet, a tablet, a pellet, a ball, a rod, a granule, a capsule, a filament, a rope, a line, a twine, a string, or a combination thereof.

8. A method for attracting a wild free ranging rodent to a treatment locus comprising:
  (a) placing at a treatment locus a product for attracting wild free ranging rodents consisting of:
    (i) a synthetic combination of at least two attractant compounds,
      wherein the at least two attractant compounds are selected from the group consisting of isoamyl alcohol, 1-hexanol, acetoin, isobutyl acetate, and 2-methylbutyl acetate; and
    (ii) a carrier, excipient, diluent, or combination thereof; and
  (b) attracting the rodent to the treatment locus.

9. The method of claim 8, wherein the rodent is a rat.

* * * * *